United States Patent
Takami

(10) Patent No.: US 9,069,826 B2
(45) Date of Patent: Jun. 30, 2015

(54) INFORMATION PROVISION SYSTEM, INFORMATION PROVISION SYSTEM CONTROL METHOD, INFORMATION PROVISION DEVICE, PROGRAM, AND INFORMATION RECORDING MEDIUM

(75) Inventor: Shinya Takami, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/123,110

(22) PCT Filed: Jan. 27, 2012

(86) PCT No.: PCT/JP2012/051860
§ 371 (c)(1),
(2), (4) Date: Dec. 13, 2013

(87) PCT Pub. No.: WO2012/164968
PCT Pub. Date: Dec. 6, 2012

(65) Prior Publication Data
US 2014/0101141 A1   Apr. 10, 2014

(30) Foreign Application Priority Data

May 31, 2011   (JP) .................................. 2011-122491

(51) Int. Cl.
*G06F 17/30* (2006.01)
*G06Q 30/00* (2012.01)
(Continued)

(52) U.S. Cl.
CPC .... *G06F 17/30554* (2013.01); *G06F 17/30973* (2013.01); *G06Q 30/00* (2013.01); *G06Q 30/0641* (2013.01); *G06F 17/30398* (2013.01); *G06F 3/048* (2013.01)

(58) Field of Classification Search
CPC ................... G06F 17/30554; G06F 17/30973; G06F 17/30398; G06F 17/30867
USPC .......................................................... 707/722
See application file for complete search history.

(56) References Cited

U.S. PATENT DOCUMENTS 5,973,663 A * 10/1999 Bates et al. .................... 715/786
6,204,846 B1 * 3/2001 Little et al. .................... 715/784
(Continued)

FOREIGN PATENT DOCUMENTS

JP   2007-128150 A   5/2007

OTHER PUBLICATIONS

International Search Report for PCT/JP2012/051860 dated Feb. 28, 2012.
(Continued)

*Primary Examiner* — Sheree Brown
(74) *Attorney, Agent, or Firm* — Hubbs, Enatsky & Inoue PLLC

(57) ABSTRACT

To provide an information provision system capable of improving a users operability in obtaining a list of desired information. A designated position obtaining unit (50) obtains a position in a screen designated by the user. In the case where the user designates a position in the screen and thereafter moving the designated position to thereby input a trace, a trace obtaining unit (51) obtains the trace input by the user. A character string extraction unit (52) extracts a character string from content shown in the screen, based on the position obtained by the designated position obtaining unit (50) or the trace obtained by the trace obtaining unit (51). A list obtaining unit (53) obtains a list of information, based on the character string extracted by the character string extraction unit (52) and the trace obtained by the trace obtaining unit (51). A display control unit (54) displays a list screen showing a list of information obtained by the list obtaining unit (53) on a display unit.

19 Claims, 17 Drawing Sheets

(51) Int. Cl.
  *G06Q 30/06*      (2012.01)
  *G06F 3/048*      (2013.01)

(56) References Cited

U.S. PATENT DOCUMENTS

| | | | |
|---|---|---|---|
| 7,770,130 B1* | 8/2010 | Kaptelinin | 715/787 |
| 8,190,997 B2* | 5/2012 | Shellen et al. | 715/733 |
| 8,490,009 B2* | 7/2013 | Takami | 715/784 |
| 8,677,264 B2* | 3/2014 | Takami | 715/786 |
| 2011/0035699 A1* | 2/2011 | Robert et al. | 715/783 |
| 2011/0265039 A1* | 10/2011 | Lyon et al. | 715/830 |
| 2012/0240079 A1* | 9/2012 | Takami | 715/784 |
| 2012/0272181 A1* | 10/2012 | Rogers et al. | 715/784 |
| 2012/0287114 A1* | 11/2012 | Hallock et al. | 345/418 |
| 2012/0290971 A1* | 11/2012 | Takami | 715/784 |
| 2012/0293625 A1* | 11/2012 | Schneider et al. | 348/46 |
| 2012/0297324 A1* | 11/2012 | Dollar et al. | 715/760 |

OTHER PUBLICATIONS

Bin Liu et al. "A Spreadsheet Algebra for a Direct Data Manipulation Query Interface", Data Engineering, 2009. ICDE '09. IEEE 25th International Conference on, IEEE, Piscataway, NJ, USA, Mar. 29, 2009, pp. 417-428, XP031447726, ISBN: 978-1-4244-3422-0.

* cited by examiner

FIG.2

| | | | |
|---|---|---|---|
| TOP>TELEVISION | | | |
| SEARCH CONDITION | KEY WORD [____32____] INCLUDED<br>33─[_____] EXCLUDED  35<br>34─<br>PRICE [_____] YEN ~ [_____] YEN | | |
| DISPLAY ORDER | ⦿ STANDARD  ○ PRICE (HIGHER ORDER)  ○ PRICE (LOWER ORDER) ←─37 | | |
| | | | [SEARCH]─36 |

| PRODUCT NAME | PRODUCT DESCRIPTION | PRICE | SHOP |
|---|---|---|---|
| ○○ 37 CLASS LIQUID CRYSTAL TV | EQUIPPED WITH X-FUNCTION | 150,000 YEN | SHOP A |
| □□ 47 CLASS PLASMA TV | ADAPTED TO 3D | 250,000 YEN | SHOP B |
| ○○ 42 CLASS LIQUID CRYSTAL TV | EQUIPPED WITH X-FUNCTION AND Y-FUNCTION | 220,000 YEN | SHOP A |
| ─────── | ─────── | ───── | ─── |
| ─────── | ─────── | ───── | ─── |
| ─────── | ─────── | ───── | ─── |
| ─────── | ─────── | ───── | ─── |
| ─────── | ─────── | ───── | ─── |
| ─────── | ─────── | ───── | ─── |
| ─────── | ─────── | ───── | ─── |

| | | | |
|---|---|---|---|
| TOP>TELEVISION | | 32 | |
| SEARCH CONDITION | KEY WORD | X-FUNCTION | INCLUDED |
| | 33 | | EXCLUDED 35 |
| | 34 | | |
| | PRICE | YEN~ | YEN |
| DISPLAY ORDER | ●STANDARD ○PRICE (HIGHER ORDER) ○PRICE (LOWER ORDER) | | ←37 |
| | | | SEARCH —36 |

| PRODUCT NAME | PRODUCT DESCRIPTION | PRICE | SHOP |
|---|---|---|---|
| ○○ 37 CLASS LIQUID CRYSTAL TV | EQUIPPED WITH X-FUNCTION | 150,000 YEN | SHOP A |
| ○○ 42 CLASS LIQUID CRYSTAL TV | EQUIPPED WITH X-FUNCTION AND Y-FUNCTION | 220,000 YEN | SHOP A |
| ○○ 32 CLASS LIQUID CRYSTAL TV | EQUIPPED WITH X-FUNCTION | 100,000 YEN | SHOP A |
| — — — — — — — — — | — — — — — — — | — — — — — | — — — |
| — — — — — — — — — | — — — — — — — | — — — — — | — — — |

| PRODUCT NAME | PRODUCT DESCRIPTION | PRICE | SHOP |
|---|---|---|---|
| ○○ 37 CLASS LIQUID CRYSTAL TV | EQUIPPED WITH X-FUNCTION | 150,000 YEN | SHOP A |
| □□ 47 CLASS PLASMA TV | ADAPTED TO 3D | 250,000 YEN | SHOP B |
| ○○ 42 CLASS LIQUID CRYSTAL TV | EQUIPPED WITH X-FUNCTION AND Y-FUNCTION | 220,000 YEN | SHOP A |
| — — — — — — — | — — — — — — — | — — — — — | — — — |
| — — — — — — — | — — — — — — — | — — — — — | — — — |
| — — — — — — — | — — — — — — — | — — — — — | — — — |
| — — — — — — — | — — — — — — — | — — — — — | — — — |
| — — — — — — — | — — — — — — — | — — — — — | — — — |
| — — — — — — — | — — — — — — — | — — — — — | — — — |
| — — — — — — — | — — — — — — — | — — — — — | — — — |

TOP>TELEVISION

SEARCH CONDITION
- KEY WORD [ 32 ] INCLUDED
- [ 33 ] EXCLUDED 35
- PRICE 34 [150,000] YEN ~ [ ] YEN

DISPLAY ORDER: ⊙ STANDARD  ○ PRICE (HIGHER ORDER)  ○ PRICE (LOWER ORDER) ← 37

[SEARCH] — 36

| CHARACTER STRING TYPE | TRACE | USE OF CHARACTER STRING |
|---|---|---|
| CHARACTER STRING OTHER THAN CHARACTER STRING INDICATING ATTRIBUTE VALUE OF PREDETERMINED ATTRIBUTE (CHARACTER STRING INDICATING OTHER THAN PRICE) | TRACE BELONGING TO FIRST TYPE (TRACE INDICATING UPPER DIRECTION) | KEYWORD FOR AND SEARCH |
| | TRACE BELONGING TO SECOND TYPE (TRACE INDICATING LOWER DIRECTION) | KEYWORD FOR NOT SEARCH |
| CHARACTER STRING INDICATING ATTRIBUTE VALUE OF PREDETERMINED ATTRIBUTE (CHARACTER STRING INDICATING PRICE) | TRACE BELONGING TO FIRST TYPE (TRACE INDICATING UPPER DIRECTION) | LOWER LIMIT |
| | TRACE BELONGING TO SECOND TYPE (TRACE INDICATING LOWER DIRECTION) | UPPER LIMIT |
| | TRACE BELONGING TO THIRD TYPE (TRACE INDICATING LEFT DIRECTION) | UPPER AND LOWER LIMITS |

FIG.10

| PRODUCT ID | NAME | MAIN CATEGORY | SUB-CATEGORY | DESCRIPTION | PRICE | SHOP ID | PRODUCT PAGE |
|---|---|---|---|---|---|---|---|
| G00001 | ○○ 37 CLASS LIQUID CRYSTAL TV | TELEVISION | LIQUID CRYSTAL, 37 CLASS | EQUIPPED WITH X-FUNCTION | 150,000 | S00001 | - - - |
| G00002 | □□ 47 CLASS PLASMA TV | TELEVISION | PLASMA, 47 CLASS, 3D | ADAPTED TO 3D | 250,000 | S00002 | - - - |
| G00003 | ○○ 42 CLASS LIQUID CRYSTAL TV | TELEVISION | LIQUID CRYSTAL, 42 CLASS | EQUIPPED WITH X-FUNCTION AND Y-FUNCTION | 220,000 | S00001 | - - - |
| G00004 | ○○ 32 CLASS LIQUID CRYSTAL TV | TELEVISION | LIQUID CRYSTAL, 32 CLASS | EQUIPPED WITH X-FUNCTION | 100,000 | S00001 | - - - |
| ... | ... | ... | ... | ... | ... | ... | ... |

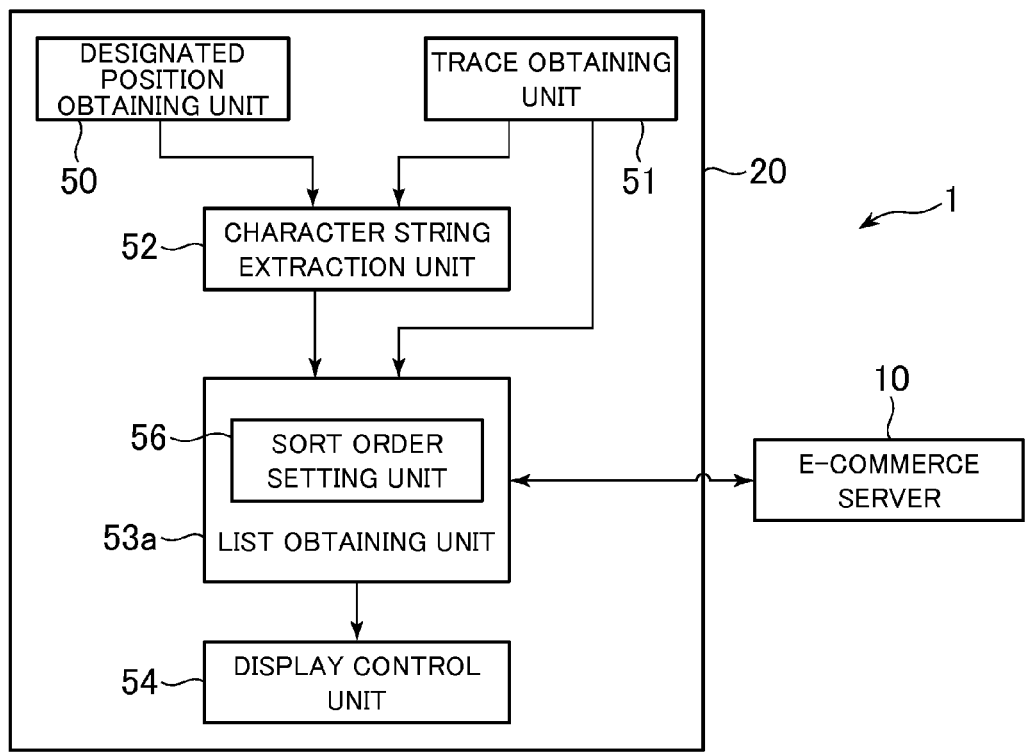

US 9,069,826 B2

INFORMATION PROVISION SYSTEM, INFORMATION PROVISION SYSTEM CONTROL METHOD, INFORMATION PROVISION DEVICE, PROGRAM, AND INFORMATION RECORDING MEDIUM

CROSS REFERENCE TO RELATED APPLICATIONS

This application is a National Stage of International Application Ser. No. PCT/JP2012/051860 filed Jan. 27, 2012, claiming priority based on Japanese Patent Application No. 2011-122491 filed on May 31, 2011. The contents of each of the above documents are incorporated herein by reference in their entirety.

TECHNICAL FIELD

The present invention relates to an information provision system, a control method for an information provision system, an information provision device, a program, and an information storage medium.

BACKGROUND ART

There is known an information provision system for providing a user with a list of information. As such an information provision system, for example, a search system for showing in a screen a list of information satisfying a search condition designated by a user is generally known.

In order to improve a users operability in the above-described information provision system, it has been attempted to simplify an operation performed by a user in obtaining a list of desired information. For example, Patent Document 1 discloses a technique for facilitating narrowing down of sites by presenting to a user a candidate condition for narrowing down the sites when the number of sites satisfying a search condition exceeds a predetermined number.

CITATION LIST

Patent Literature

Patent Literature 1: JP 2007-128150 A

SUMMARY OF INVENTION

Technical Problem

However, a conventional technique may not be satisfactory in improvement of a users operability in obtaining a list of desired information. For example, according to the technique disclosed in Patent Literature 1, a user can select a key word for narrowing down the sites only from among those presented to the user, and cannot freely designate a key word for narrowing down the sites.

The present invention has been conceived in view of the above, and an object thereof is to provide an information provision system, a control method for an information provision system, an information provision device, a program, and an information storage medium capable of improving users operability in obtaining a list of desired information.

Solution to Problem

In order to achieve the above described object, an information provision system according to the present invention is an information provision system for providing a user with a list of formation, including means for displaying a screen showing content on display means; designated position obtaining means for obtaining a position in the screen designated by the user; trace obtaining means for obtaining, in the case where the user designates a position in the screen and thereafter moves the designated position to thereby input a trace, the trace input by the user; character string extraction means for extracting a character string from content shown in the screen, based on the position obtained by the designated position obtaining means or the trace obtained by the trace obtaining means; list obtaining means for obtaining a list of information, based on the character string extracted by the character string extraction means and the trace obtained by the trace obtaining means; and list screen display control means for displaying on the display means a list screen showing the list of information obtained by the list obtaining means, wherein the list obtaining means includes means for obtaining at least a part of content stored in correlation relationship information storage means for storing correlation relationship information concerning a correlation relationship between the trace obtained by the trace obtaining means and content of information list obtaining processing that is executed based on the character string extracted by the character string extraction means, and means for executing the information list obtaining processing correlated to the trace obtained by the trace obtaining means, based on the character string extracted by the character string extraction means.

A control method for an information provision system according to the present invention is a control method for an information provision system for providing a user with a list of information, including a step of displaying a screen showing content on display means; a designated position obtaining step of obtaining a position in the screen designated by the user; a trace obtaining step of obtaining, in the case where the user designates a position in the screen and thereafter moves the designated position to thereby input a trace, the trace input by the user; a character string extraction step of extracting a character string from content shown in the screen, based on the position obtained at the designated position obtaining step or the trace obtained at the trace obtaining step; a list obtaining step of obtaining a list of information, based on the character string extracted at the character string extraction step and the trace obtained at the trace obtaining step; and a list screen display control step of displaying on the display means a list screen showing the list of information obtained at the list obtaining step, wherein the list obtaining step includes a step of obtaining at least apart of content stored in correlation relationship information storage means for storing correlation relationship information concerning a correlation relationship between the trace obtained at the trace obtaining step and content of information list obtaining processing that is executed based on the character string extracted at the character string extraction step, and a step of executing the information list obtaining processing correlated to the trace obtained at the trace obtaining step, based on the character string extracted at the character string extraction step.

An information provision device according to the present invention is an information provision device for providing a user with a list of information, including means for obtaining a character string, the character string being extracted from content shown in a screen based on a position in the screen designated by the user or a trace input by the user designating a position in the screen and thereafter moving the designated position; and list obtaining means for obtaining a list of information, based on the character string and the trace input by the user, wherein the list obtaining means includes means for obtaining at least a part of content stored in correlation relationship information storage means for storing correlation relationship information concerning a correlation relationship between the trace input by the user and content of information list obtaining processing that is executed based on the character string, and means for executing the information list obtaining processing correlated to the trace input by the user, based on the character string.

A control method for an information provision device according to the present invention is a control method for an information provision device for providing a user with a list of information, including a step of obtaining a character string, the character string being extracted from content shown in a screen based on a position in the screen designated by the user or a trace input by the user designating a position in the screen and thereafter moving the designated position; and a list obtaining step of obtaining a list of information, based on the character string and the trace input by the user, wherein the list obtaining step includes a step of obtaining at least apart of content stored in correlation relationship information storage means for storing correlation relationship information concerning a correlation relationship between the trace input by the user and content of information list obtaining processing that is executed based on the character string, and a step of executing the information list obtaining processing correlated to the trace input by the user, based on the character string.

A program according to the present invention is a program for causing a computer to function as an information provision device for providing a user with a list of information, the program for causing the computer to function as means for obtaining a character string, the character string being extracted from content shown in a screen based on a position in the screen designated by the user or a trace input by the user designating a position in the screen and thereafter moving the designated position; and list obtaining means for obtaining a list of information, based on the character string and the trace input by the user, wherein the list obtaining means includes means for obtaining at least a part of content stored in correlation relationship information storage means for storing correlation relationship information concerning a correlation relationship between the trace input by the user and content of information list obtaining processing that is executed based on the character string, and means for executing the information list obtaining processing correlated to the trace input by the user, based on the character string.

An information storage medium according to the present invention is a computer readable information storage medium storing the above mentioned program.

According to one aspect of the present invention, the list obtaining means may include search condition setting means for setting a search condition using the character string extracted by the character string extraction means, based on the trace obtained by the trace obtaining means, and obtain a list of information satisfying the search condition set by the search condition setting means, the correlation relationship information may be information concerning a correlation relationship between the trace obtained by the trace obtaining means and a manner of using the character string extracted by the character string extraction means in the search condition, and the search condition setting means may set a search condition using the character string extracted by the character string extraction means in the manner of use correlated to the trace obtained by the trace obtaining means.

According to one aspect of the present invention, the correlation relationship information may be defined such that a search condition for obtaining a list of information relevant to the character string extracted by the character string extraction means is set in the case where the trace obtained by the trace obtaining means belongs to a first type, and a search condition for obtaining a list of information not relevant to the character string extracted by the character string extraction means is set in the case where the trace obtained by the trace obtaining means belongs to a second type, and the search condition setting means may set either the search condition for obtaining the list of information relevant to the character string extracted by the character string extraction means or the search condition for obtaining the list of information not relevant to the character string extracted by the character string extraction means, based on the trace obtained by the trace obtaining means.

According to one aspect of the present invention, the character string extracted by the character string extraction means may indicate an attribute value relevant to an attribute of the information, the correlation relationship information may be defined such that a search condition for obtaining a list of information having an attribute value equal to or larger than an attribute value indicated by the character string extracted by the character string extraction means or an attribute value larger than the attribute value indicated by the character string extracted by the character string extraction means is set in the case where the trace obtained by the trace obtaining means belongs to a first type, and a search condition for obtaining a list of information having an attribute value equal to or smaller than the attribute value indicated by the character string extracted by the character string extraction means or an attribute value smaller than the attribute value indicated by the character string extracted by the character string extraction means is set in the case where the trace obtained by the trace obtaining means belongs to a second type, and the search condition setting means may set either the search condition for obtaining the list of information having the attribute value equal to or larger than the attribute value indicated by the character string extracted by the character string extraction means or the attribute value larger than the attribute value indicated by the character string extracted by the character string extraction means, or the search condition for obtaining the list of information having the attribute value equal to or smaller than the attribute value indicated by the character string extracted by the character string extraction means or the attribute value smaller than the attribute value indicated by the character string extracted by the character string extraction means, based on the trace obtained by the trace obtaining means.

According to one aspect of the present invention, a sentence relevant to the information and at least one of a plurality of kinds of categories may be correlated to the information, the correlation relationship information may be defined such that a search condition for obtaining a list of information relevant to the character string extracted by the character string extraction means is set in the case where the trace obtained by the trace obtaining means belongs to a predetermined type, the search condition setting means may include means for determining whether or not the character string extracted by the character string extraction means indicates any of the plurality of kinds of categories, in the case where the search condition for obtaining the list of information relevant to the character string extracted by the character string extraction means is set, means for setting, in the case where it is determined that the character string extracted by the character string extraction means indicates any of the plurality of kinds of categories, a search condition for searching for a list of information correlated to the category indicated by the character string extracted by the character string extraction means, and means for setting, in the case where it is not determined that the character string extracted by the character string extraction means indicates any of the plurality of kinds of categories, a search condition for searching for a list of information such that the sentence includes the character string extracted by the character string extraction means.

According to one aspect of the present invention, the list obtaining means may include sort order setting means for setting a sort order for the list of information and obtain a list of information sorted in the sort order set by the sort order setting means, using as a key item an item corresponding to the character string extracted by the character string extraction means, the correlation relationship information may be information concerning a correlation relationship between the trace obtained by the trace obtaining means and the sort order, and the sort order setting means may set the sort order for the list of information to a sort order correlated to the trace obtained by the trace obtaining means.

According to one aspect of the present invention, the correlation relationship information may be defined such that the sort order for the list of information is set to an ascending order in the case where the trace obtained by the trace obtaining means is a first type, and the sort order for the list of information is set to a descending order in the case where the trace obtained by the trace obtaining means is a second type, and the sort order setting means may set either the ascending order or the descending order as the sort order for the list of information, based on the trace obtained by the trace obtaining means.

According to one aspect of the present invention, the information provision system may further include means for determining whether or not a position in the screen is newly designated by the user within a reference period of time after completion of input of the trace by the user, wherein in the case where it is determined that a position in the screen is newly designated by the user during the period, the designated position obtaining may obtain the newly designated position, in the case where the user newly designates a position in the screen and thereafter changes the newly designated position to thereby newly input a trace, the trace obtaining means may obtain the trace newly input by the user, the character string extraction means may newly extract a character string from content shown in the screen, based on the position newly designated by the user or the trace newly input by the user, and in the case where it is determined that no position in the screen is newly designated by the user during the period, the list obtaining means may obtain the list of information, based on a character string extracted thus far and a trace input thus far.

According to one aspect of the present invention, the information provision system may further include means for determining whether or not a length of the trace obtained by the trace obtaining means satisfies a predetermined condition, wherein in the case where it is determined that the length of the trace obtained by the trace obtaining means satisfies the predetermined condition and a position in the screen is newly designated by the user, the designated position obtaining means may obtain the newly designated position, in the case where the user newly designates a position in the screen and thereafter changes the newly designated position to thereby newly input a trace, the trace obtaining means may obtain the trace newly input by the user, the character string extraction means newly extracts a character string from content shown in the screen, based on the position newly designated by the user or the trace newly input by the user, and in the case where it is determined that the length of the trace obtained by the trace obtaining means does not satisfy the predetermined condition, the list obtaining means may obtain the list of information, based on a character string extracted thus far and a trace obtained thus far.

According to one aspect of the present invention, the information provision system may further include presentation image display control means for showing in the screen, a presentation image for presenting to the user the correlation relationship indicated by the correlation relationship information, in the case where the position in the screen designated by the user is obtained by the designated position obtaining means.

According to one aspect of the present invention, the correlation relationship information storage means may store the correlation relationship information so as to be correlated to a character string, and the list obtaining means may determine the information list obtaining processing correlated to the trace obtained by the trace obtaining means, based on correlation relationship information correlated to the character string extracted by the character string extraction means, and may execute the information list obtaining processing, based on the character string extracted by the character string extraction means.

The information provision system further includes presentation image display control means for showing in the screen, a presentation image for presenting to the user the correlation relationship indicated by the correlation relationship information correlated to the character string extracted by the character string extraction means, in the case where the position in the screen designated by the user is obtained by the designated position obtaining means.

Advantageous Effects of Invention

According to the present invention, it is possible to improve a users operability in obtaining a list of desired information.

BRIEF DESCRIPTION OF DRAWINGS

FIG. 2 shows one example of a product list screen;

FIG. 5 explains a function of the e-commerce system according to the first embodiment;

FIG. 7 explains a function of the e-commerce system according to the first embodiment;

FIG. 9 shows one example of correlation relationship information;

FIG. 10 shows one example of a product table;

FIG. 13 is a functional block diagram of the e-commerce system according to the second embodiment;

FIG. 14 shows one example of correlation relationship information;

DESCRIPTION OF EMBODIMENTS

Below, an example of an embodiment of the present invention will be described in detail with reference to the drawings. Specifically, a case will be described in which the present invention is applied to an e-commerce (electronic commerce) system for implementing a virtual shopping mall where a plurality of shops are open. That is, an example of a case will be described in which an information provision system according to an embodiment of the present invention is implemented in an e-commerce system as an information provision system for providing a user with a list of product information.

Figure 1:
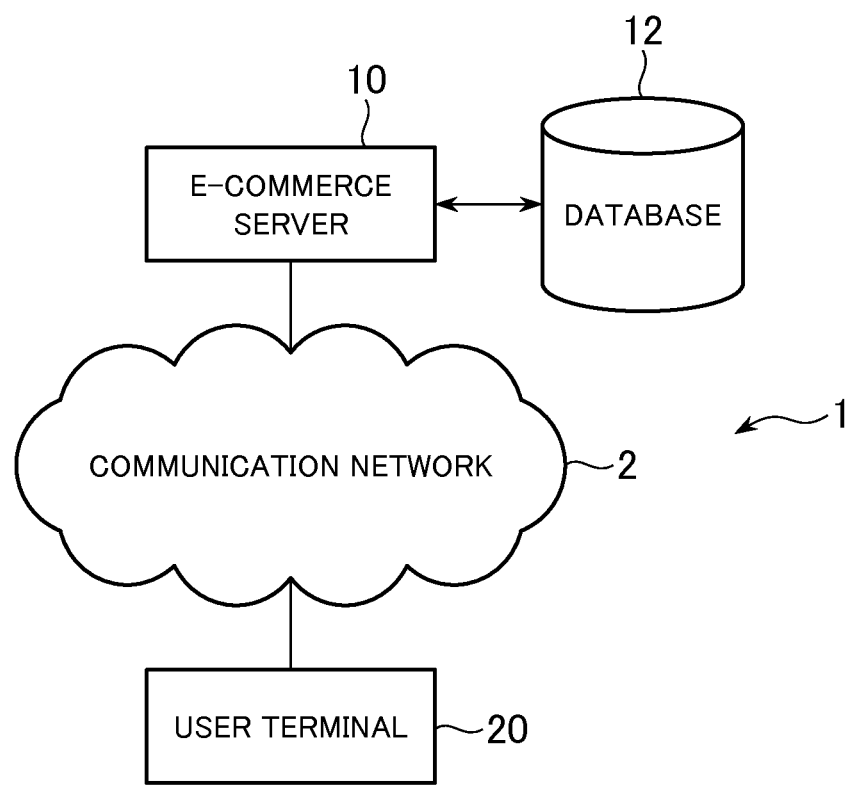
FIG. 1 shows an overall structure of an e-commerce system according to a first embodiment.

[First Embodiment]FIG. 1 shows an overall structure of an e-commerce system according to a first embodiment of the present invention. As shown in FIG. 1, the e-commerce system 1 according to the first embodiment includes an e-commerce server 10 and a user terminal 20 (an information provision device). The e-commerce server 10 and the user terminal 20 are connected to a communication network 2 including the Internet, or the like, for example, and can execute mutual data communication.

The e-commerce server 10 is, for example, a server that functions as a portal of a virtual shopping mall. The e-commerce server 10 executes processing based on a processing request received from the user terminal 20. For example, the e-commerce server 10 has a control unit (for example, a CPU, or the like) for executing processing according to a program, a main memory unit (for example, a RAM or the like), an auxiliary storage unit (for example, a hard disk or a solid state drive), an optical disk drive for reading a program and data stored on an optical disk (an information storage medium), and a communication interface.

The control unit executes processing according to a program stored in the auxiliary storage unit. For example, a program and data are supplied to the auxiliary storage unit via the optical disk (the information storage medium). That is, the optical disk storing a program and data is mounted in the optical disk drive, and the program and data stored on the optical disk are read by the optical disk drive and stored in the auxiliary storage unit. Note that, alternatively, a program and data may be supplied to the auxiliary storage unit via an information storage medium (for example, a memory card) other than the optical disk. Still alternatively, a program and data may be supplied to the auxiliary storage unit via the communication network 2.

The e-commerce server 10 can access the database 12. For example, data on users who use the virtual shopping mall, data on shops that open in the virtual shopping mall, data on products dealt in the virtual shopping mall, data on a history of transactions performed in the virtual shopping mall, and the like, are stored in the database 12. Note that the database 12 may be created in a server different from the e-commerce server 10 or in the e-commerce server 10.

The user terminal 20 is an information processing device operated by a user. The user terminal 20 is, for example, a portable information terminal, a portable phone, a personal computer, or the like. The user terminal 20 is used to buy a product in the virtual shopping mall. For example, the user terminal 20 includes a control unit (for example, a CPU), a main memory unit (for example, a RAM), an auxiliary storage unit (for example, a hard disk or a solid state drive), a memory card slot, an operation unit, a display unit (for example, a liquid crystal display), a sound output unit (for example, a speaker), and a communication interface.

The control unit executes processing according to a program stored in the auxiliary storage unit. For example, a program and data are supplied to the auxiliary storage unit via a memory card (an information storage medium). That is, the memory card storing a program and data is inserted in the memory card slot, and the program and data stored in the memory card is read by the memory card slot and stored in the auxiliary storage unit. Alternatively, a program and data may be supplied to the auxiliary storage unit via an information storage medium (for example, an optical disk) other than the memory card. Still alternatively, a program and data may be supplied to the auxiliary storage unit via the communication network 2.

An operation unit is operated by a user. In this embodiment, a designation unit for use by a user to designate a position in a screen displayed on the display unit is provided as the operation unit. That is, for example, a pointing device, such as a touch panel, a mouse, a stick, or the like, is provided as the operation unit. Note that the following description is based on an assumption that a touch panel formed over the display unit is provided at the user terminal 20.

In this embodiment, for example, an HTTP daemon is run in the e-commerce server 10. A browser is activated in the user terminal 20. The user terminal 20 sends a processing request (an HTTP request) via the browser to the e-commerce server 10, and the e-commerce server 10 sends a processing result (an HTTP response) corresponding to the above mentioned processing request to the user terminal 20. For example, page data described in a web page descriptive language is sent to the user terminal 20. Then, a screen based on the processing result is displayed on the display unit of the user terminal 20, based on the page data.

Figure 3:
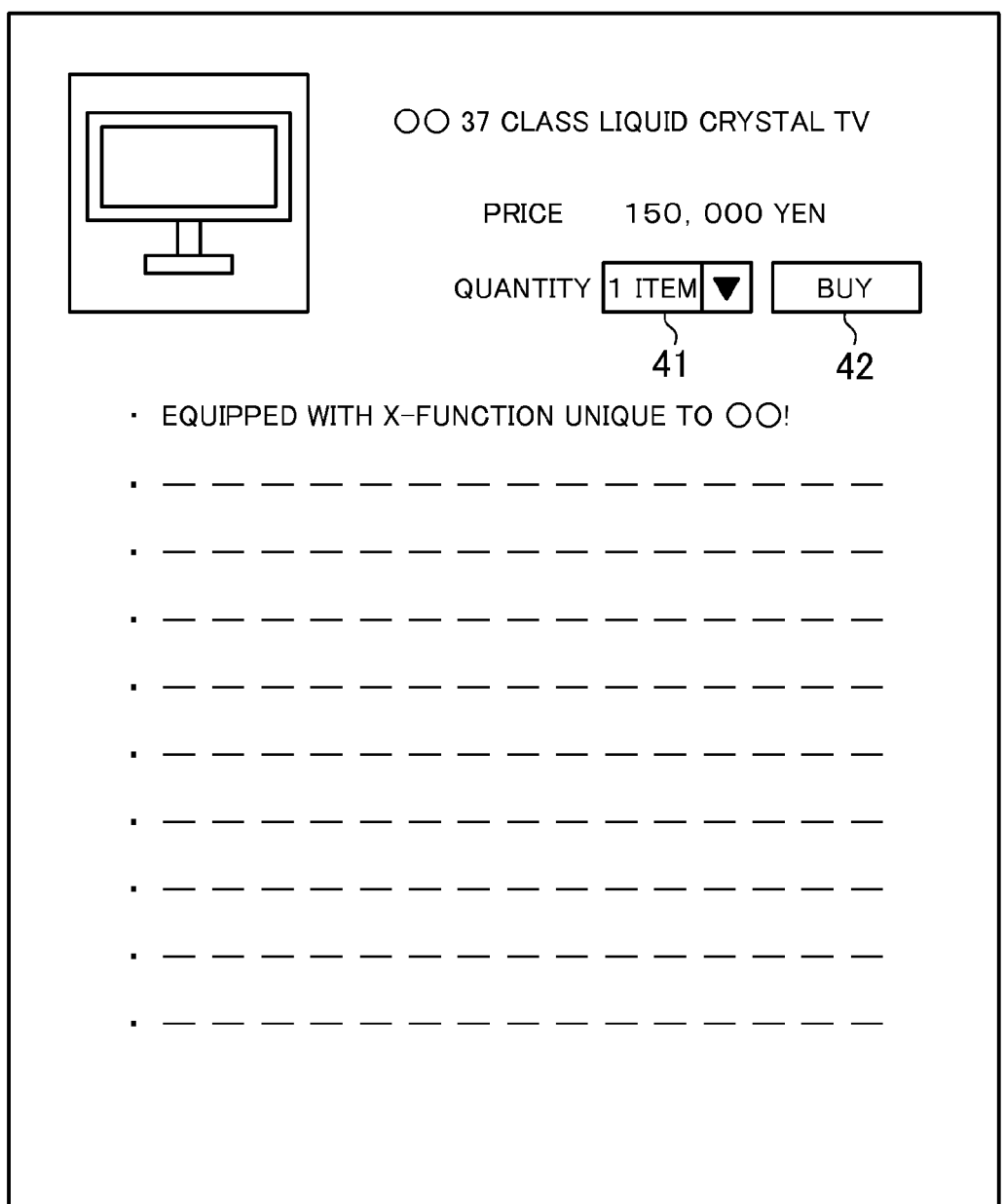
FIG. 3 shows one example of a product screen.

Below, an example of a screen that is displayed on the display unit of the user terminal 20 when using the virtual shopping mall will be described. FIGS. 2 and 3 show examples of a screen. These screens are displayed based on the page data sent from the e-commerce server 10 to the user terminal 20.

When a user using the virtual shopping mall accesses the e-commerce server 10, using the user terminal 20, the front screen (front page: not shown) of the virtual shopping mall is displayed on the display unit of the user terminal 20. The user selects a product category or searches for a product to find a desired product.

FIG. 2 shows one example of a product list screen that is displayed on the display unit when a user selects a product category or searches for a product. Specifically, FIG. 2 shows one example of a product list screen 30 that is displayed in the case where the "television" category is selected.

A list of products belonging to the "television" category is shown in a list section 31 in the product list screen 30 shown in FIG. 2. Specifically, the name, description, and price of a product and the name of a shop selling the product are shown in the list section 31. Key word input boxes 32, 33, price input boxes 34, 35, and a search button 36 are also shown in the product list screen 30, so that a user can input a search condition for further narrowing down a list of the products.

The key word input boxes 32, 33 are boxes in which to input a key word. Of these, the key word input box 32 is a box in which to input a key word for so-called AND search. That is, when a user selects the search button 36 with a key word input in the key word input box 32, a list of products such that the key word is included in the product name, product description, or shop name is shown in the list section 31. Meanwhile, the key word input box 33 is a box in which to input a key word for so-called NOT search. That is, when a user selects the search button 36 with a key word input in the key word input box 33, a list of products such that the key word is not included in the product name, product description, and shop name is shown in the list section 31.

The price input boxes 34, 35 are boxes in which to input the lower limit and upper limits, respectively, of a price. When a user selects the search button 36 with a price input in the price input box 34, a list of products having a price equal to or higher than the input price is shown in the list section 31. Meanwhile, when the user selects the search button 36 with a price input in the price input box 35, a list of products having a price equal to or lower than the input price is shown in the list section 31.

Further, a display order designation box 37 for designating a display order is shown in the product list screen 30, so that a user can designate a display order in which to display the list of the products. In the example shown in FIG. 2, any of "standard", "price (higher order: High to Low)", and "price (lower order: Low to High)" can be selected in the display order designation box 37. When the user selects "standard", a list of products sorted in ascending order of product ID, for example, is shown in the list section 31. Further, when the user selects "price (higher order)", a list of products sorted in descending order of price is shown in the list section 31. Similarly, when the user selects "price (lower order)", a list of products sorted in ascending order of price is shown in the list section 31.

Note that in the list section 31, the product name is a link button. That is, link information to a product screen (a product page) showing details on a product is correlated to the product name, so that in the case where the user selects the product name, the product screen is displayed on the display unit.

FIG. 3 shows one example of the product screen. The name, image, price, and detailed description of a product are shown in the product screen 40 shown in FIG. 3. A user wishing to buy a product selects desired quantity of the product in a quantity box 41, and selects a buy button 42. When the user selects the buy button 42, a purchase screen (not shown) for a purchase procedure is displayed on the display unit of the user terminal 20. The user performs a purchase procedure in the purchase screen.

In the e-commerce system 1 according to this embodiment, a user can designate a product search condition with a single simple operation. Below, this function will be described.

Figure 4:
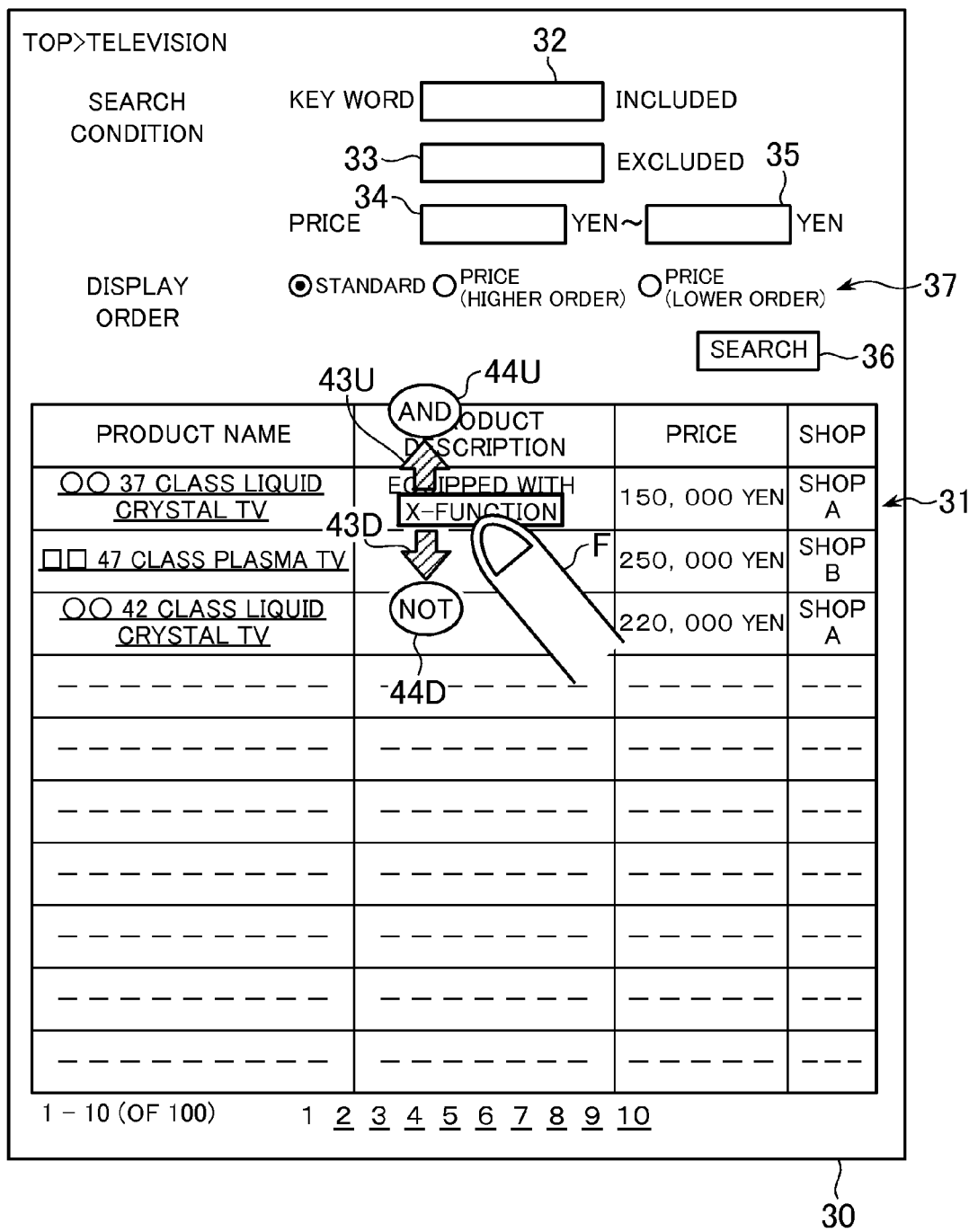
FIG. 4 explains a function of the e-commerce system according to the first embodiment.

FIGS. 4 and 5 explain the above-described function. Assume here a case in which a user wishes to designate a character string "X-function" as a key word for AND search.

In this case, as shown in FIG. 4, a user points out the character string "X-function" shown in the product list screen 30, for example, with their finger F. That is, the user touches the touch panel with their finger F so as to press the character string "X-function" shown in the product list screen 30. When the user points out the character string "X-function" with their finger F, the character string "X-function" is distinctly shown (for example, highlighted or reverse-lighted).

When the user points out the character string "X-function", an up arrow 43U for the upper direction and a down arrow 43D for the lower direction are shown so as to be associated with the character string "X-function". Further, a sign 44U for AND search is assigned to the up arrow 43U, while a sing 44D for NOT search is assigned to the down arrow 43D.

When the user moves the finger F touching the touch panel in the upper direction in the situation shown in FIG. 4, the character string "X-function" is set as a keyword for AND search. In this case, search processing similar to search processing, which is executed in the case where "X-function" is input in the key word input box 32 and the search button 36 is selected, is executed. Then, a list of products whose name, description, or the like includes the character string "X-function" is shown in the list section 31. FIG. 5 shows one example of the product list screen 30 in this case.

Meanwhile, when the user moves their finger F touching touch panel in the lower direction in the situation shown in FIG. 4, the character string "X-function" is set as a key word for NOT search. In this case, search processing similar to search processing, which is executed in the case where "X-function" is input in the key word input box 33 and the search button 36 is selected, is executed. Then, a list of products whose name, description, and the like do not include the character string "X-function" is shown in the list section 31.

As described above, in the e-commerce system 1 according to this embodiment, with a single operation of putting their finger F on the touch panel and sliding the finger F (flick operation), a user can designate their desired character string as a key word and also which of AND search and NOT search the keyword is used for as a key word.

In conducting a search such as is described above in a conventional e-commerce system, for example, an operation such as is described below needs to be performed. That is, a user performs a copy operation while a character string shown in the product list screen 30 is selected, and then a paste operation for pasting the copied character string into either one of the keyword input boxes 32 and 33, and thereafter presses the search button 36. Regarding this point, according to the e-commerce system 1 according to this embodiment, the above described search can be conducted with a single simple operation.

Figure 6:
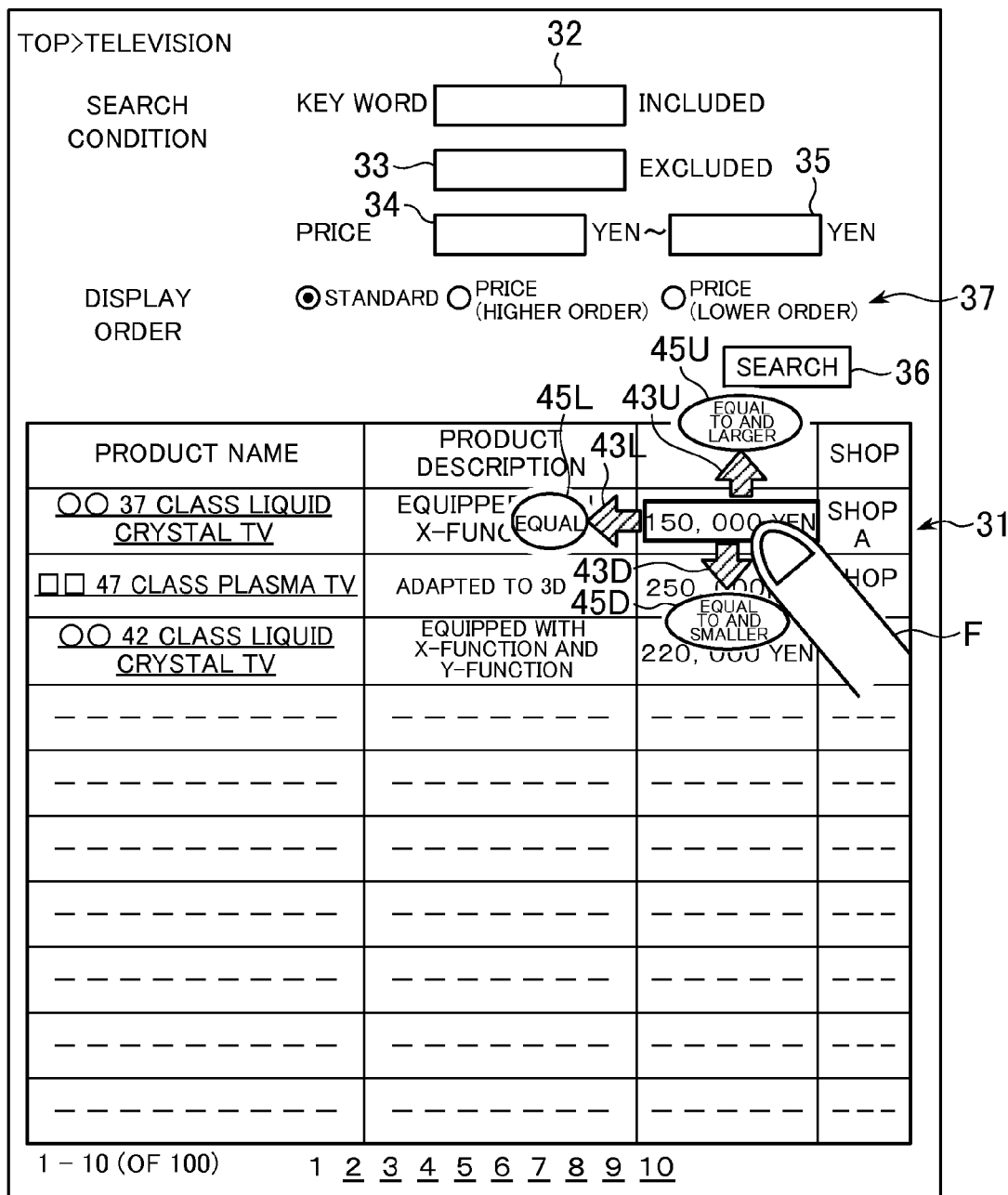
FIG. 6 explains a function of the e-commerce system according to the first embodiment.

FIGS. 6 and 7 explain the above described function of the e-commerce system 1 according to this embodiment. Below, assume a case in which a user wishes to designate "150,000 yen" shown in the product list screen 30 as a product search condition.

In this case, as shown in FIG. 6, a user points out the character string "150,000 yen" shown in the product list screen 30 with their finger F. When the user points out the character string "150,000 yen" with their finger F, the character string "150,000 yen" is distinctly shown (for example, highlighted or reverse-lighted).

When the user points out the character string "150,000 yen", the up arrow 43U, the down arrow 43D, and the left arrow 43L are shown associated with the character string "150,000 yen". Further, the sign 45U, meaning use of the price indicated by the character string as the lower limit, is assigned to the up arrow 43U; a sign 45D, meaning use of the price indicated by the character string as the upper limit, is assigned to the down arrow 43D. Still further, a sign 45L, meaning use of the price indicated by the character string as both of the upper limit and the lower limit, is assigned to the left arrow 43L.

When the user moves their finger F touching the touch panel in the upper direction in the situation shown in FIG. 6, "150,000 yen" is set as the lower limit price. In this case, search processing similar to search processing, which is executed in the case where "150,000 yen" is input in the price input box 34 in the product list screen 30 and the search button 36 is selected, is executed. Then, a list of products priced "150,000 yen" or higher is shown in the list section 31. FIG. 7 shows one example of the product list screen 30 in this case.

Meanwhile, when the user moves their finger F touching the touch panel in the lower direction in the situation shown in FIG. 6, "150,000 yen" is set as the upper limit price. In this case, search processing similar to search processing, which is executed in the case where "150,000 yen" is input in the price input box 35 in the product list screen 30 and the search button 36 is selected, is executed. Then, a list of products priced "150,000 yen" or lower is shown in the list section 31.

Similarly, when the user moves their finger F touching the touch panel in the left direction in the situation shown in FIG. 6, "150,000 yen" is set as both of the upper and lower limit prices. In this case, search processing similar to search processing, which is executed in the case where "150,000 yen" is input in both of the price input boxes 34 and 35 in the product list screen 30 and the search button 36 is selected, is executed. Then, a list of products priced "150,000 yen" is shown in the list section 31.

As described above, in the e-commerce system 1 according to this embodiment, with a single operation of putting a finger F on the touch panel and sliding the finger F (flick operation), a user designates a price for use as a product search condition and also a manner of using the price. That is, in the e-commerce system 1 according to this embodiment, the above described search can be conducted with a single simple operation.

Note that although a case in which a key word and/or a price are/is designated in the product list screen 30 is described above, a key word and/or a price may be designated in the product screen 40 as well, similar to the product list screen 30. When a key word and/or a price are/is designated in the product screen 40, the product screen 40 may shift to the product list screen 30 so that the product list screen 30 is displayed on the display unit. Then, a list of products satisfying the search condition may be shown in the list section 31.

Figure 8:
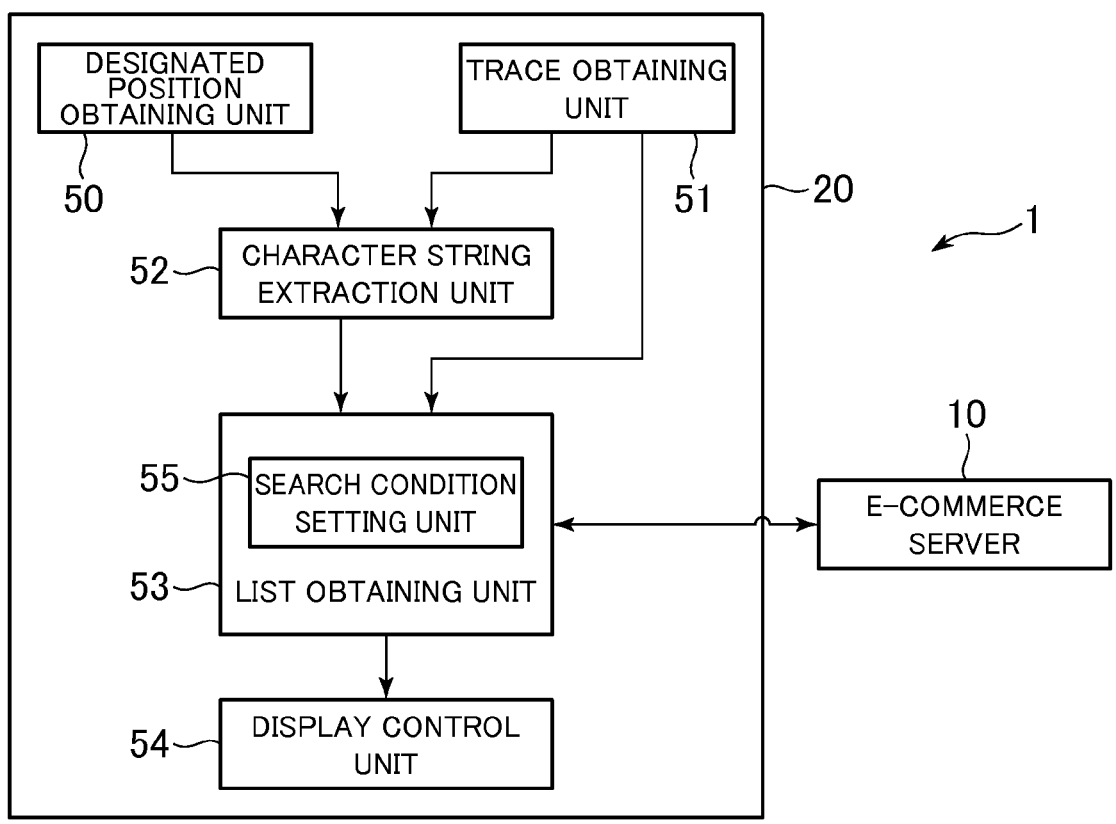
FIG. 8 is a functional block diagram of the e-commerce system according to the first embodiment.

Below, a structure for achieving the above mentioned function will be described. FIG. 8 is a functional block diagram showing only function blocks relevant to the present invention among those achieved in the e-commerce system 1 according to this embodiment. As shown in FIG. 8, the e-commerce system 1 includes a designated position obtaining unit 50, a trace obtaining unit 51, a character string extraction unit 52, a list obtaining unit 53, and a display control unit 54. For example, these function blocks are implemented in the user terminal 20. That is, the control unit of the user terminal 20 executes processing according to a program, thereby functioning as these function blocks.

The designated position obtaining unit 50 obtains a position in a screen designated (pointed out) by a user. In this embodiment, a touch panel is formed overlapping the display unit and outputs position information indicating the position touched (pressed) by the user. Thus, the designated position obtaining unit 50 obtains the position information output from the touch panel. That is, the designated position obtaining unit 50 obtains the position touched by the user (the position on the touch panel touched by the user) as the users designated position (the position in a screen designated by the user).

When the user designates (points out) a position in the screen and then moves the designated position to thereby input a trace, the trace obtaining unit 51 obtains the trace input by the user. In this embodiment, when the user touches the touch panel with their finger and then slides the finger on the touch panel, the trace obtaining unit 51 obtains the trace of the position touched by the user. For example, the trace obtaining unit 51 obtains the position information output from the touch panel for every predetermined period of time (for example, $\frac{1}{60}^{th}$ of a second), and obtains a set of position information items each obtained for every predetermined period of time while the user is sliding their finger on the touch panel as information indicating the trace input by the user.

The character string extraction unit 52 extracts a character string pointed out by a user. That is, a character string is extracted from the content shown in a screen, based on the position obtained by the designated position obtaining unit 50. For example, in the example described referring to FIG. 4, the character string extraction unit 52 extracts a character string from the content shown in the product list screen 30. Note that as a method for extracting a character string from the content shown in a screen, based on the position designated by a user in the screen, various publicly known methods can be employed.

For example, the character string extraction unit 52 determines a letter displayed at the position obtained by the designated position obtaining unit 50 (hereinafter referred to as a reference letter), based on the position obtained by the designated position obtaining unit 50 and the content shown in the screen. Then, the character string extraction unit 52 extracts a character string composed of the reference letter and one or more letters preceding and/or following the reference letter. For example, the character string extraction unit 52 specifies a term to which the reference letter belongs, based on the type of the reference letter (for example, hiragana, katakana, Chinese character, alphabet, symbol, or the like) and the type of the one or more letters preceding and/or following the reference letter. Then, the character string extraction unit 52 extracts the term.

Note that the above described character string extraction method is a selection method employed when the content is written in Japanese. That is, character string extraction is conducted in consideration of the characteristics of the language in which the content is written. For example, when English is used to write content, as each word is separated by a space, a character string (word) separated by a space preceding or following the reference letter may be extracted.

The list obtaining unit 53 obtains a list of information, based on the character string extracted by the character string extraction unit 52 and the trace obtained by the trace obtaining unit 51.

Specifically, based on the trace obtained by the trace obtaining unit 51, the list obtaining unit 53 changes the content of processing for obtaining a list of information based on the character string extracted by the character string extraction unit 52 (hereinafter referred to as "list obtaining processing").

In order to change the content of list obtaining processing based on the trace obtained by the trace obtaining unit 51, correlation relationship information concerning a correlation relationship between the trace obtained by the trace obtaining unit 51 and content of list obtaining processing is necessary. A specific example of the correlation relationship information will be described later (see FIG. 9). The list obtaining unit 53 changes the content of list obtaining processing based on such correlation relationship information and the trace obtained by the trace obtaining unit 51. That is, the list obtaining unit 53 determines list obtaining processing correlated to the trace obtained by the trace obtaining unit 51, based on the above-described correlation relationship information, and executes the list obtaining processing based on the character string extracted by the character string extraction unit 52.

Note that when it is necessary to change the above-described correlation relationship in accordance with the character string extracted by the character string extraction unit 52, it is necessary that the above-described correlation relationship information is stored so as to be correlated to a character string. A specific example of the correlation relationship information in this case as well will be described later (see FIG. 9). In this case, the list obtaining unit 53 refers to the correlation relationship information correlated to the character string extracted by the character string extraction unit 52, and then determines list obtaining processing correlated to the trace obtained by the trace obtaining unit 51, based on the correlation relationship information, and executes the list obtaining processing, based on the character string extracted by the character string extraction unit 52.

In this embodiment, the list obtaining unit 53 includes a search condition setting unit 55. The search condition setting unit 55 sets a search condition using the character string extracted by the character string extraction unit 52, based on the trace obtained by the trace obtaining unit 51. Then, the list obtaining unit 53 obtains a list of information satisfying the search condition.

In setting a search condition based on the trace obtained by the trace obtaining unit 51, correlation relationship information concerning a correlation relationship between a trace and a manner of using the character string extracted by the character string extraction unit 52 in a search condition (that is, how to use the character string in a search condition) is necessary.

FIG. 9 shows one example of the correlation relationship information. In the correlation relationship information shown in FIG. 9, a correlation relationship between a "trace" and a "manner of using a character string" is set for every "type of character string". In the correlation relationship information shown in FIG. 9, a correlation relationship for a character string other than a character string indicating an attribute value of a predetermined attribute and a correlation relationship for a character string indicating an attribute value of a predetermined attribute are defined. Note that an "attribute value" refers to a numeric value relevant to an attribute of a product. In this embodiment, "an attribute value of a predetermined attribute" refers to "a price", for example. Note that the content of the correlation relationship information shown in FIG. 9 is set to the content that enables a user to perform an operation described referring to FIGS. 4 to 7, for example.

According to the correlation relationship information shown in FIG. 9, a manner of using a character string other than a character string indicating an attribute value of a predetermined attribute is set as described below.

That is, when the trace belongs to the first type (for example, when the direction indicated by the trace is the upper direction (a first direction)), the character string extracted by the character string extraction unit 52 is used as a key word for AND search. That is, the character string extracted by the character string extraction unit 52 is used to obtain a list of products relevant to the character string.

Further, when the trace belongs to the second type (for example, when the direction indicated by the trace is the lower direction (a second direction)), a character string extracted by the character string extraction unit 52 is used as a key word for NOT search. That is, the character string extracted by the character string extraction unit 52 is used to obtain a list of product not relevant to the character string.

Meanwhile, according to the correlation relationship information shown in FIG. 9, a manner of using a character string indicating an attribute value of a predetermined attribute is set as described below.

That is, when a trace belongs to the first type (for example, when the direction indicated by the trace is the upper direction (the first direction)), the numeric value indicated by the character string extracted by the character string extraction unit 52 is used as the lower limit of an attribute value (price) of a predetermined attribute. That is, the character string extracted by the character string extraction unit 52 is used to obtain a list of products having an attribute value (price) of a predetermined attribute which is equal to or larger than the numeric value indicated by the character string (or an attribute value of a predetermined attribute which is higher than the numeric value indicated by the character string).

Meanwhile, when the trace belongs to the second type (for example, the direction indicated by the trace is the lower direction (the second direction)), the numeric value indicated by the character string extracted by the character string extraction unit 52 is used as the upper limit of an attribute value (price) of a predetermined attribute. That is, the character string extracted by the character string extraction unit 52 is used to obtain a list of products having an attribute value (price) of a predetermined attribute which is equal to or smaller than the numeric value indicated by the character string (or an attribute value of a predetermined attribute which is lower than the numeric value indicated by the character string).

Further, when the trace belongs to the third type (for example, the direction indicated by the trace is the left direction (a third direction)), the numeric value indicated by the character string extracted by the character string extraction unit 52 is used as both of the upper limit and the lower limit of the attribute value (price) of a predetermined attribute. That is, the character string extracted by the character string extraction unit 52 is used to obtain a list of products having an attribute value (price) of a predetermined attribute which is equal to the numeric value indicated by the character string.

With reference to the above-described correlation relationship information, the search condition setting unit 55 sets a search condition using the character string extracted by the character string extraction unit 52 in the manner correlated to the trace obtained by the trace obtaining unit 51.

The list obtaining unit 53 requests the e-commerce server 10 for a list of products satisfying the search condition set by the search condition setting unit 55, and obtains the list of products satisfying the search condition from the e-commerce server 10.

That is, the list obtaining unit 53 sends information indicating the search condition set by the search condition setting unit 55 to the e-commerce server 10. Having received the information, the e-commerce server 10 executes processing for searching a product based on the search condition. In this case, the e-commerce server 10 accesses a product table stored in the database 12.

FIG. 10 shows one example of the product table. The product table shown in FIG. 10 includes "product ID", "name", "main category", "sub-category", "description", "price", "shop ID", and "product page" fields.

Identification information of a product is registered in the "product ID" field. The name of the product is registered in the "name" field. The main category of the product is registered in the "main category" field. The sub-category of the product is registered in the "sub-category" field. For example, a plurality of terms indicating a method that can be employed by the same kind of products or a plurality of terms indicating a function possibly equipped to the same kind of products are defined in advance, and one or more terms indicating a method employed by the product or a function equipped to the product among the plurality of terms is/are registered in the "sub-category" field. For example, for "television", terms such as "32 class", "37 class", "42 class", "liquid crystal", "plasma", "3D", and the like are defined in advance, and one or more terms indicating a method employed by the product and a function equipped to the product is/are registered in the "sub-category" field.

A description on the product is registered in the "description" field. The price of the product is registered in the "price" field. Identification information of a shop that sells the product is registered in the "shop ID" field. Information indicating product page data is registered in the "product page" field. For example, the URL of a product page is registered in the "product page" field.

For example, when the character string "X-function" is set as a key word for AND search, the e-commerce server 10 obtains a list of products such that the character string "X-function" is included in the "name" or "description" field. In this case, the e-commerce server 10 may obtain a list of products such that the character string "X-function" is included in the product page as well. Meanwhile, when the character string "X-function is set as a key word for NOT search, the e-commerce server 10 obtains a list of products such that the character string "X-function" is not included in the "name" and "description" fields. In this case, the e-commerce server 10 may obtain a list of products such that the character string "X-function" is not included in the product page as well.

For example, when "150,000 yen" is set as the upper limit price, the e-commerce server 10 obtains a list of products such that the price registered in the "price" field is equal to or lower than 150,000 yen. Similarly, when "150,000 yen" is set as the lower limit price, the e-commerce server 10 obtains a list of products such that the price registered in the "price" field is equal to or higher than 150,000 yen. When "150,000 yen" is set as both of the upper and lower limit prices, the e-commerce server 10 obtains a list of products such that the price registered in the "price" field is 150,000 yen.

The e-commerce server 10 sends data indicating a list of products satisfying the search condition (that is, a product list page data) to the user terminal 20. The list obtaining unit 53 receives the data sent from the e-commerce server 10 to thereby obtain the list of products satisfying the search condition.

The display control unit 54 displays various screens on the display unit of the user terminal 20. For example, the display control unit 54 (list screen display control means) displays the product list screen 30 showing a list of products obtained by the list obtaining unit 53 on the display unit. Further, for example, the display control unit 54 displays the product screen 40 on the display unit.

Note that when the position in a screen designated by a user is obtained by the designated position obtaining unit 50, the display control unit 54 (presentation image display control means) shows in the screen a presentation image for presenting to the user the correlation relationship indicated by the above-described correlation relationship information.

When the correlation relationship information is stored correlated to a character string (see FIG. 9), the display control unit 54 (presentation image display control means) shows in a screen, a presentation image for presenting to the user the correlation relationship indicated by the correlation relationship information correlated to the character string extracted by the character string extraction unit 52.

For example, when the character string extracted by the character string extraction unit 52 is not a character string indicating an attribute value (for example, a price) of a predetermined attribute, the display control unit 54 (presentation image display control means) shows in a screen, a presentation image for presenting to the user a correlation relationship between a "trace" and a "manner of using a character string" with respect to a character string other than a character string indicating an attribute value (for example, a price) of a predetermined attribute. For example, the combination of the up arrow 43U and the sign 44U and the combination of the down arrow 43D and the sign 44D, shown in FIG. 4, correspond to the presentation image.

Further, for example, when the character string extracted by the character string extraction unit 52 is a character string indicating an attribute value (for example, a price) of a predetermined attribute, the display control unit 54 (presentation image display control means) shows in a screen, a presentation image for presenting to a user a correlation relationship between a "trace" and a "manner of using a character string" with respect to a character string indicating an attribute value (for example, a price) of a predetermined attribute. For example, the combination of the up arrow 43U and the sign 45U, the combination of the down arrow 43D and the sign 45D, and the combination of the left arrow 43L and the sign 45L, shown in FIG. 6, correspond to the presentation image.

Figure 11:
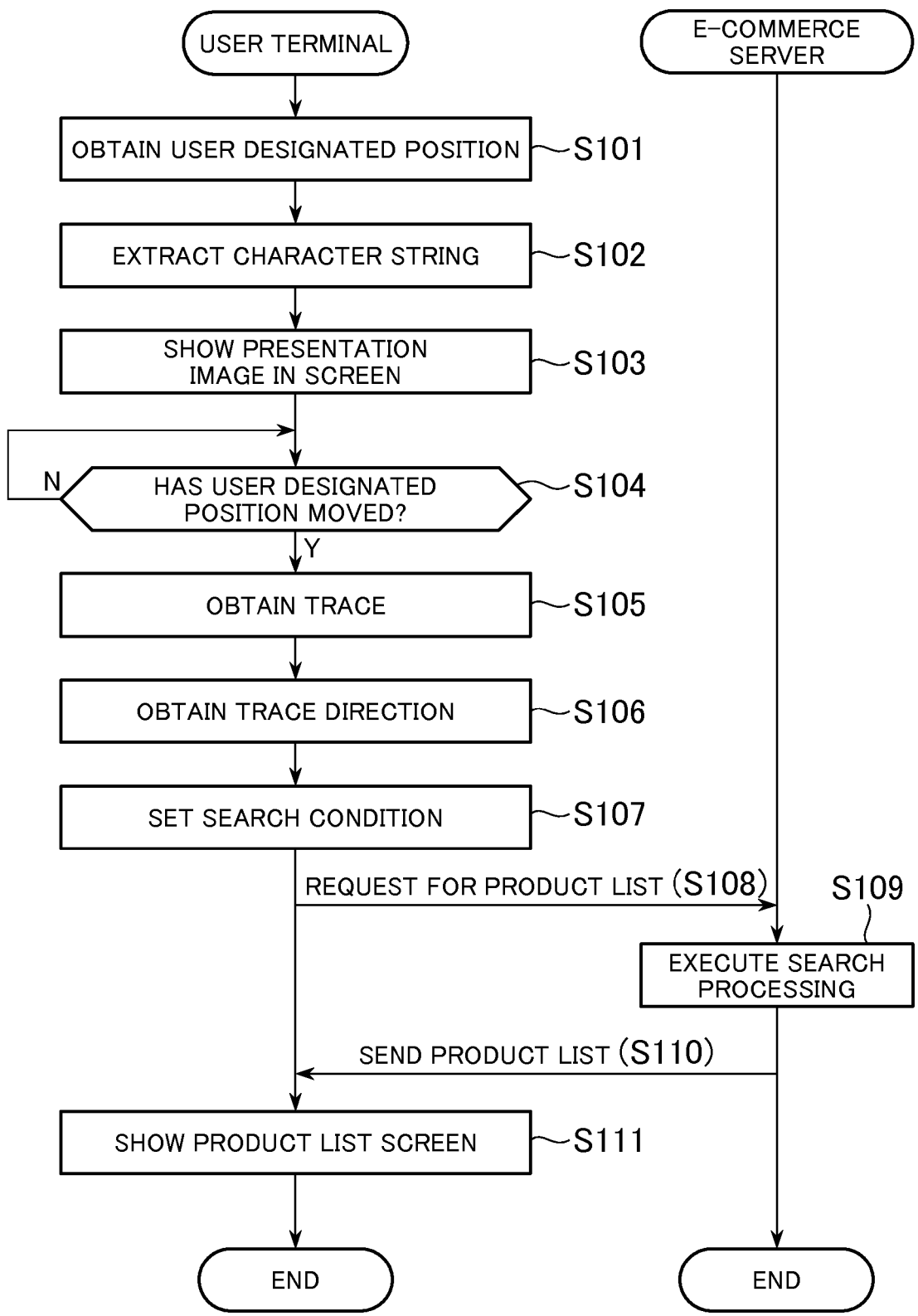
FIG. 11 shows one example of processing that is executed in the e-commerce system according to the first embodiment.

The designated position obtaining unit 50, the trace obtaining unit 51, the character string extraction unit 52, the list obtaining unit 53, and the display control unit 54, as described above, are implemented by the control unit of the user terminal 20 by executing processing according to a program. FIG. 11 is a flowchart showing one example of processing executed by the control unit of the user terminal 20 in order to implement the above-described function block. The control unit of the user terminal 20 executes processing shown in FIG. 11 according to a program, to thereby function as the above-described function block.

FIG. 11 shows processing that is executed when a user designates a position in the product list screen 30 or the product screen 40.

When a position in the product list screen 30 or the product screen 40 is designated by a user, the control unit of the user terminal 20 (the designated position obtaining unit 50) obtains the position in the screen designated by the user, based on the position information output from the touch panel, as shown in FIG. 11 (S101). Then, the control unit (the character string extraction unit 52) extracts a character string from the content shown in the screen, based on the position obtained at step S101 (S102).

The control unit (the display control unit 54) shows the presentation image in the screen (S103). For example, when the character string extracted at step S102 is not a character string indicating a price (an attribute value of a predetermined attribute), the control unit shows in the screen, the up arrow 43U and the sign 44U, and the down arrow 43D and the sign 44D, such as are shown in FIG. 4. Meanwhile, when the character string extracted at step S102 is a character string indicating a price (an attribute value of a predetermined attribute), the control unit shows in the screen, the up arrow 43U and the sign 45U, the down arrow 43D and the sign 45D, and the left arrow 43L and the sign 45L, such as are shown in FIG. 6. Note that whether or not the character string extracted at step S102 is a character string indicating a price may be determined by determining, for example, whether or not a letter indicating a unit corresponding to a price (a predetermined attribute) is included.

Thereafter, the control unit determines whether or not the users designated position has moved, based on the position information output from the touch panel (S104). When it is determined that the users designated position has not moved, the control unit continues monitoring whether or not the users designated position has moved. Note that although not shown in FIG. 11, when the users finger is removed from the touch panel without the users designated position having moved, this processing may be ended.

When it is determined that the users designated position has moved, the control unit (the trace obtaining unit 51)

obtains the trace of the users designated position (S105). Further, the control unit obtains the direction of the trace (S106).

Thereafter, the control unit (the search condition setting unit 55) sets a search condition using the character string extracted at step S102, based on the direction of the trace obtained at step S106 (S107). For example, the control unit refers to the above-described correlation relationship information (FIG. 9). Then, the control unit determines how to use the character string extracted at step S102, and sets a search condition using the character string extracted at step S102.

Thereafter, the control unit (the list obtaining unit 53) requests the e-commerce server 10 for a list of products satisfying the search condition set at step S107 (S108). For example, the control unit sends an HTTP request indicating a request for a product list page to the e-commerce server 10. Information indicating the search condition set at step S107 is correlated to the HTTP request.

Having received the above-described request, the e-commerce server 10 executes search processing based on the search condition set at step S107 (S109). Then, the e-commerce server 10 sends a product list page indicating the result of search processing at step S109 to the user terminal 20. That is, the e-commerce server 10 sends a list of products satisfying the search condition set at step S107 to the user terminal 20 (S110).

The control unit (the list obtaining unit 53) of the user terminal 20 receives the product list page sent from the e-commerce server 10. Then, the control unit (the display control unit 54) displays the product list screen 30 (a product list page) on the display unit (S111). With the above, description on the processing shown in FIG. 11 is completed.

According to the e-commerce system 1 according to the first embodiment described above, with a single simple operation of touching the touch panel with a finger and sliding the finger, a user can designate their desired character string as a key word or the like for product search and also how to use the character string in the search. According to the e-commerce system 1 according to the first embodiment, it is possible to improve a users operability in obtaining a list of desired information.

Further, in the e-commerce system 1 according to the first embodiment, when a user designates their desired character string, the up arrow 43U, the down arrow 43D, the left arrow 43L, and the signs 44U, 44D, 45U, 45D, 45L are shown. Relying on these presentation images, a user can know which direction of sliding their finger leads to designation of use of the character string in their desired manner in search.

Note here that in this embodiment, at least one of a plurality of predetermined kinds of categories (the main category and the sub-category) is correlated to each product. For example, in the product table shown in FIG. 10, at least one of a plurality of kinds of categories, such as "television", "liquid crystal", "plasma", "32 class", "37 class", "42 class", "47 class", "3D", or the like, is correlated to a product. In this case, the search condition setting unit 55 may execute processing such as is to be described below.

Assume here a case in which the character string extracted by the character string extraction unit 52 is designated as a key word for AND search. That is, assume a case in which a search condition for obtaining a list of information relevant to the character string extracted by the character string extraction unit 52 is set. In this case, the search condition setting unit 55 determines whether or not the character string extracted by the character string extraction unit 52 indicates any of the above described plurality of kinds of categories.

When it is determined that the character string extracted by the character string extraction unit 52 indicates any of the above-described plurality of kinds of categories, the search condition setting unit 55 sets a search condition for searching for a list of products correlated to that category. For example, when the character string extracted by the character string extraction unit 52 is liquid crystal, as the character string liquid crystal indicates one of the above mentioned plurality of kinds of categories (sub-category: liquid crystal), the search condition setting unit 55 sets a search condition for obtaining a list of products such that "liquid crystal" is registered in the "main category" or "sub-category" field.

Meanwhile, when it is determined that the character string extracted by the character string extraction unit 52 indicates none of the above described plurality of kinds of categories, the search condition setting unit 55 sets a search condition for searching for a list of products such that the character string extracted by the character string extraction unit 52 is included in the product name, description, product page, or the like. For example, when the character string extracted by the character string extraction unit 52 is "X-function", as the character string "X-function" does not indicate any of the above described plurality of kinds of categories, the search condition setting unit 55 sets a search condition for obtaining a list of products such that the character string "X-function" is included in the "name" field, the "description" field, or the product page.

In the manner described above, when narrowing down by category is possible, products are narrowed down by category. This can resultantly improve search accuracy.

[Second Embodiment] An e-commerce system according to a second embodiment of the present invention will be described. An overall structure of the e-commerce system 1 according to the second embodiment is similar to that in the first embodiment. The e-commerce system 1 according to the second embodiment as well provides a virtual shopping mall similar to that in the first embodiment. Below, mainly, difference of the e-commerce system 1 according to the second embodiment from that in the first embodiment will be described.

In the e-commerce system 1 according to the second embodiment, a user can designate a display order of a list of products with a single simple operation. Below, this function will be described.

Figure 12:
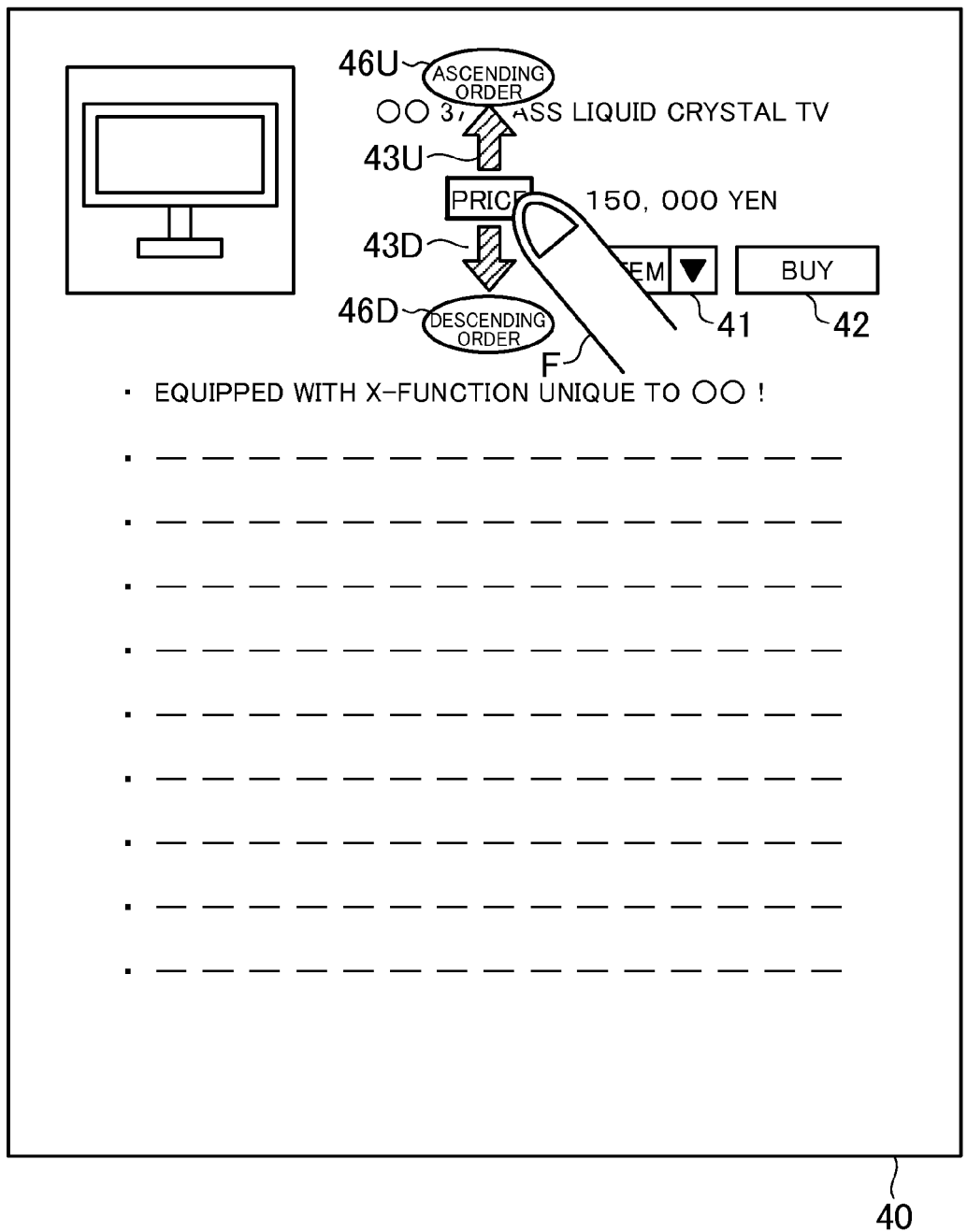
FIG. 12 explains a function of an e-commerce system according to a second embodiment.

FIG. 12 describes the above-described function. Note that assume a case in which a user looking at the product screen 40 wishes to see a list of products sorted in ascending order or descending order of price.

In this case, as shown in FIG. 12, the user points out, for example, the character string "price" shown in the product screen 40 with their finger F. When the user points out the character string "price" with their finger F, the character string "price" is distinctly shown (for example, highlighted or reverse-lighted).

Further, when the user points out the character string "price" with their finger F, the up arrow 43U and the down arrow 43D are shown so as to be associated with the character string "price". Further, a sign 46U for "ascending order" is assigned to the up arrow 43U, and a sign 46D for "descending order" is assigned to the down arrow 43D.

When the user moves their finger F touching the touch panel in the upper direction in the situation shown in FIG. 12, the user thereby designates sorting of a list of products in ascending order of price. In this case, the screen shifts from the product screen 40 to the product list screen 30. Then, a list of products sorted in ascending order of price is shown in the list section 31 of the product list screen 30, similar to a case in which the "price (lower order)" is selected in the display order designation box 37 in the product list screen 30.

Meanwhile, when the user moves their finger F touching the touch panel in the lower direction in the situation shown in FIG. 12, the user thereby designate sorting of a list of products in descending order of price. In this case, the screen shifts from the product screen 40 to the product list screen 30. Then, a list of products sorted in descending order of price is shown in the list section 31 of the product list screen 30, similar to a case in which the "price (higher order)" is selected in the display order designation box 37 in the product list screen 30.

As described above, in the e-commerce system 1 according to the second embodiment, with a single simple operation of touching the touch panel with their finger and sliding the finger, a user designates a key item for sorting a list of products and also either "ascending order" or "descending order" as a display order.

FIG. 13 is a functional block diagram showing functional blocks relevant to the present invention among those implemented in the e-commerce system 1 according to the second embodiment. Note that in the functional block diagram shown in FIG. 13, a functional block similar to that in FIG. 8 is given the same reference numeral.

As shown in FIG. 13, the e-commerce system 1 according to the second embodiment includes a designated position obtaining unit 50, a trace obtaining unit 51, a character string extraction unit 52, a list obtaining unit 53a, and a display control unit 54. The designated position obtaining unit 50, the trace obtaining unit 51, the character string extraction unit 52, and the display control unit 54 are similar to those in the first embodiment, and thus not described here.

Similar to the list obtaining unit 53 in the first embodiment, the list obtaining unit 53a as well is implemented in the user terminal 20. That is, the control unit of the user terminal 20 executes processing according to a program, to thereby function as the list obtaining unit 53a.

The list obtaining unit 53a obtains a list of products sorted by an attribute item corresponding to the character string extracted by the character string extraction unit 52.

In the second embodiment, the list obtaining unit 53a includes a sort order setting unit 56. Based on the trace obtained by the trace obtaining unit 51, the sort order setting unit 56 sets a sort order in which to sort a list of products by an attribute item corresponding to the character string extracted by the character string extraction unit 52. The list obtaining unit 53 obtains a list of products sorted in the sort order set by the sort order setting unit 56, using the attribute item corresponding to the character string extracted by the character string extraction unit 52 as a key item.

In setting a sort order based on the trace obtained by the trace obtaining unit 51, correlation relationship information concerning a correlation relationship between a trace and a sort order is necessary. FIG. 14 shows one example of the correlation relationship information. According to the correlation relationship information shown in FIG. 14, a correlation relationship between a "trace" and a "sort order" is set. Note that the content of the correlation relationship information shown in FIG. 14 is set to the content that enables a user to perform an operation such as is described referring to FIG. 12.

According to the correlation relationship information shown in FIG. 14, the sort order is set to the "ascending order" when the trace belongs to the first type (for example, when the direction indicated by the trace is the upper direction (the first direction)). Further, the sort order is set to the "descending order" when the trace belongs to the second type (for example, when the direction indicated by the trace is the lower direction (the second direction)).

When the correlation relationship information is information such as is shown in FIG. 14, the sort order setting unit 56 sets either the ascending order or the descending order as a sort order for a list of products, based on the correlation relationship information shown in FIG. 14 and the trace obtained by the trace obtaining unit 51.

The list obtaining unit 53a requests the e-commerce server 10 for a list of products sorted in the sort order set by the sort order setting unit 56, using an attribute item corresponding to the character string extracted by the character string extraction unit 52 as a keyword for sorting, and receives the list of products from the e-commerce server 10. The display control unit 54 (list screen display control means) displays the product list screen 30 showing a list of products obtained by the list obtaining unit 53a on the display unit.

Figure 15:
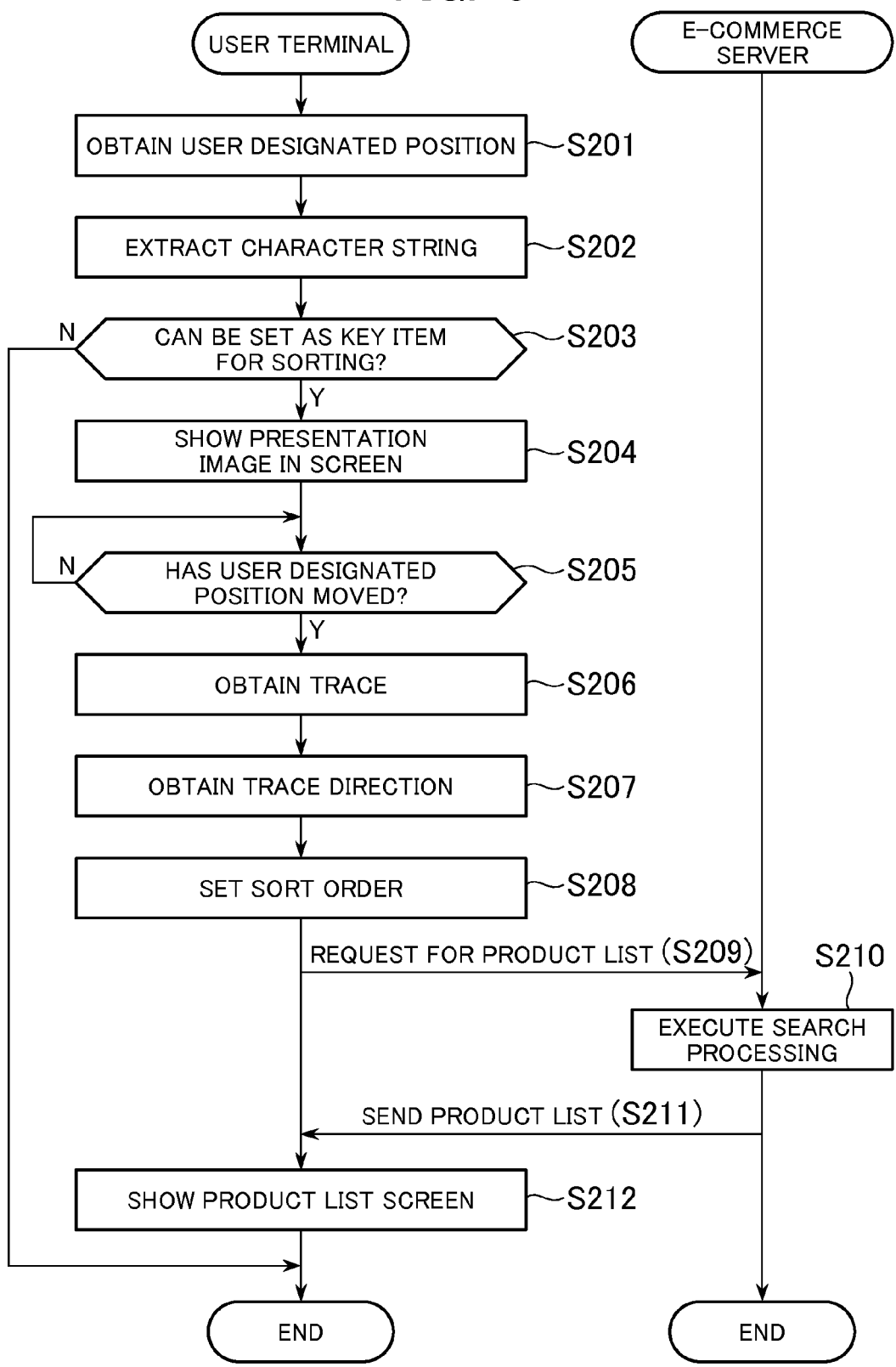
FIG. 15 shows one example of processing that is executed in the e-commerce system according to the second embodiment.

The designated position obtaining unit 50, the trace obtaining unit 51, the character string extraction unit 52, the list obtaining unit 53a, and the display control unit 54 are implemented by the control unit of the user terminal 20 by executing processing according to a program. FIG. 15 is a flowchart showing one example of processing executed by the control unit of the user terminal 20 in order to implement the above-described function blocks. The control unit of the user terminal 20 executes the processing shown in FIG. 15 according to a program, to thereby function as the above-described function block.

FIG. 15 shows processing executed when a user designates a position in the product list screen 30 or the product screen 40. The processing at steps S201, S202 in FIG. 15 is similar to that at steps S101, S102 in FIG. 11, and thus not described here.

After execution of the processing at step S102, the control unit determines whether or not the character string extracted at step S102 can be set as a key item for sorting (S203). That is, the control unit determines whether or not the character string extracted at step S102 indicates an attribute item that can be set as the key item for sorting.

For example, when the character string extracted at step S102 is a "price", a "name", or the like, it is determined that the character string indicates the attribute item that can be set as the key item for sorting. Meanwhile, when the character string extracted at step S102 is "X-function" or the like, it is determined that the character string does not indicate the attribute item that can be set as the key item for sorting. Note that when the character string extracted at step S102 is "150,000 yen", as "150,000 yen" indicates an attribute value of the attribute item "price", it may be determined that the character string extracted at step S102 indicates the attribute item that can be set as the key item for sorting.

When the character string extracted at step S102 cannot be set as the key item for sorting, the control unit ends this processing. Meanwhile, when the character string extracted at step S102 can be set as a key item for sorting, the control unit executes the processing at steps S204 to S207. Note that the processing at steps S204 to S207 is similar to that at steps S103 to S106 in FIG. 11, and is thus not described here.

After execution of the processing at step S207, the control unit (the sort order setting unit 56) of the user terminal 20 sets a sort order, based on the direction of the trace obtained at step S207 (S208). For example, with reference to the above-described correlation relationship information (FIG. 14), the control unit sets a sort order to one correlated to the direction of the trace obtained at step S207.

Thereafter, the control unit (the list obtaining unit 53) requests the e-commerce server 10 for a list of products sorted in the sort order set at step S208, using the attribute item indicated by the character string extracted at step S202 as the key item (S209). For example, the control unit sends an HTTP request indicating a request for a product list page to the e-commerce server 10. Information indicating the attribute item indicated by the character string extracted at step S202 as the key item for sorting and information indicating the sort order set at step S208 are correlated to the HTTP request.

In addition, information indicating the search condition originally designated as well is correlated to the HTTP request. For example, in a case where the processing shown in FIG. 15 is executed upon a users designating a position in the product list screen 30, the search condition designated in the product list screen 30 corresponds to the "search condition originally designated". Meanwhile, in a case where the processing shown in FIG. 15 is executed upon a users designating a position in the product screen 40, the search condition designated in the product list screen 30 before shifting to the product screen 40 corresponds to the "search condition originally designated".

Having received the above described request, the e-commerce server 10 executes search processing, and obtains a list of products sorted in the sort order set at step S208, using the attribute item indicated by the character string extracted at step S202 as the key item for sorting (S210). Then, the e-commerce server 10 sends a list of products obtained at step S210 to the user terminal 20 (S211). That is, the e-commerce server 10 sends a product list page showing a result of search processing at step S210 to the user terminal 20.

The control unit (the list obtaining unit 53a) of the user terminal 20 receives the product list page sent from the e-commerce server 10. Then, the control unit (the display control unit 54) displays the product list screen 30 (the product list page) on the display unit (S212). With the above, description on the processing shown in FIG. 15 is completed.

According to the e-commerce system 1 according to the second embodiment described above, with a single simple operation of touching the touch panel with a finger and sliding the finger, a user can designate their desired attribute item as a key item for sorting and also either the ascending order or the descending order as a sort order. According to the e-commerce system 1 according to the second embodiment, it is possible to improve a users operability in obtaining a list of desired information.

In the e-commerce system 1 according to the second embodiment, when a user designates their desired character string, the up arrow 43U, the down arrow 43D, and the signs 46U, 46D are shown. Relying on these presentation images, a user can know which direction of sliding their finger leads to designation of either "ascending order" or "descending order".

The present invention is not limited to the above described first and second embodiments.

(1) For example, the character string extraction unit 52 may extract a character string from the content shown in a screen, based on the trace obtained by the trace obtaining unit 51. That is, the character string extraction unit 52 may determine (estimate) the character string designated by a user based on the trace obtained by the trace obtaining unit 51, and extract the character string.

Figure 16:
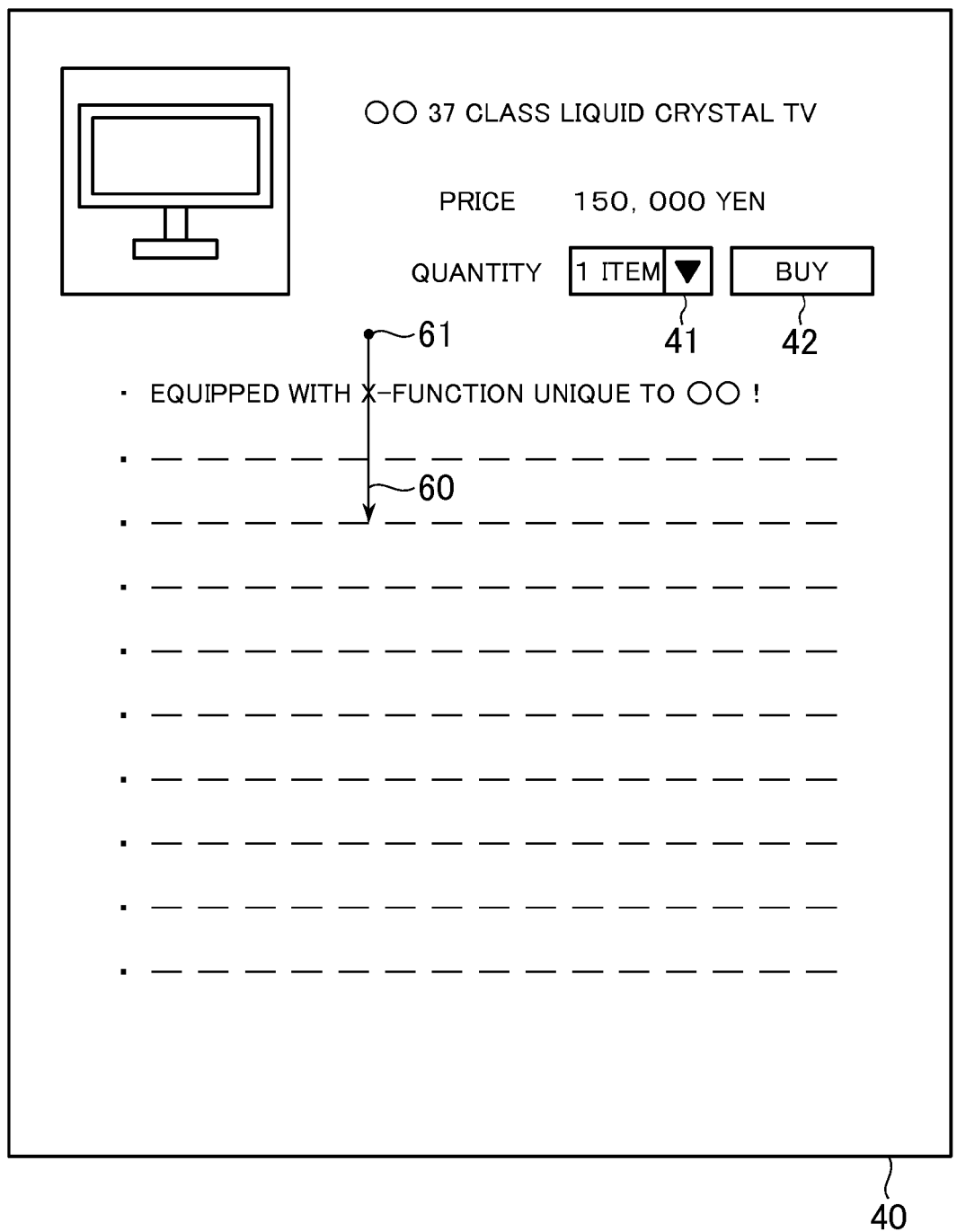
FIG. 16 explains a method for extracting a character string from content, based on a trace input by a user.

FIG. 16 describes a function of the character string extraction unit 52 in this case. Note that the reference numeral 60 in FIG. 16 refers to the trace of a position designated by a user. The reference numeral 61 refers to a position in the screen initially designated by the user (that is, the start of the trace). For example, as shown in FIG. 16, when no letter is shown at the position 61 in the screen initially designated by the user, the character string extraction unit 52 may determine a letter first intersected by the trace 60 of the users designated position (the trace of the users finger) as the "reference letter" described above. In the example shown in FIG. 16, for example, the letter "X", which is first intersected by the trace 60 of the users designated position, may be determined as the "reference letter" described above. In the manner described above, the character string extraction unit 52 may extract the character string "X-function".

(2) For example, in the example described referring to FIG. 4, the user slides their finger F in the upper or lower direction to thereby designate which of AND search and NOT search the character string is used for as a key word. However, the user may slide their finger in a direction other than the upper direction and the lower direction (for example, the left direction or the right direction) to designate which of AND search and NOT search the character string is used for as the key word. This is similarly applicable to the example described referring to FIG. 12.

(3) For example, a case in which the user designates either of two options is described referring to FIGS. 4 and 12, and a case in which the user designates any of three options is described referring to FIG. 6. The present invention can be applied to a case in which the user designates any of four or more options.

(4) For example, in the example described referring to FIG. 4, the user can designate which of AND search and NOT search the character string is used for as the key word by utilizing the direction of the trace (that is, the sliding direction of the finger F). However, the user may designate which of AND search and NOT search the character string is used for as the key word by utilizing an element other than the direction of the trace.

For example, the user may designate which of AND search and NOT search the character string is used for as the key word by utilizing a figure indicated by a trace. For example, when the figure indicated by the trace input by the user is a circle (a first figure) (that is, when the user slides their finger F on the touch panel so as to draw a circle), the character string may be used as the key word for AND search. For example, when the figure indicated by the trace input by the user is a triangle (a second figure) (that is, when the user slides their finger F on the touch panel so as to draw a triangle), the character string may be used as the key word for NOT search. This is similarly applicable to the examples described referring to FIGS. 6 and 12.

Below, processing executed by the list obtaining unit 53, 53a in this case will be described. The list obtaining unit 53, 53a in this case obtains a list of information, based on the character string extracted by the character string extraction unit 52 and the figure indicated by the trace obtained by the trace obtaining unit 51.

For example, the search condition setting unit 55 in the first embodiment sets a search condition using the character string extracted by the character string extraction unit 52, based on the figure indicated by the trace obtained by the trace obtaining unit 51. In this case, the above described correlation relationship information is information concerning a correlation relationship between the figure indicated by the trace obtained by the trace obtaining unit 51 and a manner of using the character string extracted by the character string extraction unit 52 in a search condition (that is, how to use the character string in a search condition).

For example, based on the figure indicated by the trace obtained by the trace obtaining unit 51, the sort order setting unit 56 in the second embodiment sets a sort order in which to sort a list of information by an attribute item corresponding to the character string extracted by the character string extraction unit 52. In this case, the above described correlation relationship information is information concerning a correlation relationship between the figure indicated by the trace obtained by the trace obtaining unit 51 and a sort order.

In the example described referring to FIG. 4, the user may designate which of AND search and NOT search the character string is used for as the key word by utilizing the length of the trace. For example, when the length of a trace input by the user is equal to or larger than a reference value, the character string may be used as the key word for AND search. Meanwhile, when the length of the trace input by the user is smaller than the reference value, the character string may be used as the key word for NOT search. This is similarly applicable to the examples referring to FIGS. 6 and 12.

The list obtaining unit 53, 53*a* in this case utilizes the length of the trace obtained by the trace obtaining unit 51, instead of the figure indicated by the trace obtained by the trace obtaining unit 51. In the above described manner, the user may designate which of AND search and NOT search the character string is used for as the key word by adjusting the length of the trace in the example shown in FIG. 4, for example.

(5) For example, in the first embodiment, an example in which the user designates a single character string and also how to use the character string in a search condition is described. However, the user may designate a plurality of character strings and, with respect to each of the plurality of character strings, how to use the character string in a search condition.

For example, in the product list screen 30 shown in FIG. 2, the character string "X-function" may be designated as the keyword for AND search, and the character string "Y-function" may be designated as the key word for NOT search. Alternatively, the character string "X-function" may be designated as the key word for AND search, and the character string "150,000 yen" may be designated as the upper limit price. Still alternatively, the character string "150,000 yen" may be designated as the lower limit price, and the character string "220,000 yen" may be designated as the upper limit price.

Below, assuming a case in which a plurality of character strings are designated, and, with respect to each of the plurality of character strings, which of AND search and NOT search the character string is used for as the key word is designated, an example of an operation performed by the user in the case will be described. In addition, a structure for enabling such an operation will also be described. Note that assume here a case in which the character string "X-function" is designated as the key word for AND search and the character string "Y-function" is designated as the key word for NOT search in the product list screen 30 shown in FIG. 2. Below, two examples will be described.

(5-1) Initially, the first example will be described. For example, the user touches the touch panel with their finger to thereby point out the character string "X-function", and then slides the finger in the upper direction. Thereafter, within a reference period of time (for example, three seconds), the user touches the touch panel with their finger to thereby point out the character string "Y-function". And then the user slides the finger in the lower direction. When this operation is performed, the character string "X-function" is designated as the key word for AND search, and the character string "Y-function" is designated as the keyword for NOT search.

Operations of the designated position obtaining unit 50, the trace obtaining unit 51, the character string extraction unit 52, and the list obtaining unit 53 when the above described operation is possible will be described.

Initially, the designated position obtaining unit 50 obtains a position in the screen designated by a user (a first position). Further, the trace obtaining unit 51 obtains a trace (a first trace) input by the user designating the position in the screen (the first position) and then moving the designated position. Thereafter, the character string extraction unit 52 extracts a character string (a first character string) from the content shown in the screen, based on the position obtained by the designated position obtaining unit 50 (or the trace obtained by the trace obtaining unit 51).

Further, the user terminal 20 monitors whether or not the user newly designates a position in the screen within a reference period of time after completion of input of the trace.

When it is determined that the user newly designates a position in the screen within the reference period of time after completion of input of the trace, the designated position obtaining unit 50 obtains the newly designated position (a second position). Further, the trace obtaining unit 51 obtains a trace (a second trace) input by the user designating the above mentioned new position and then moving the designated position. Still further, the character string extraction unit 52 obtains a character string (a second character string) from the content shown in the screen, based on the above mentioned new position obtained by the designated position obtaining unit 50 (or the new trace obtained by the trace obtaining unit 51). In this case as well, whether or not the user newly designates a position in the screen within a reference period of time after completion of input of the trace is monitored.

When it is not determined that the user newly designates a position in the screen within the predetermined reference period of time after completion of input of the trace, obtaining by the list obtaining unit 53 is executed. In this case, the list obtaining unit 53 obtains a list of information, based on the character string obtained thus far and the trace obtained thus far.

Note that in a case where a plurality of character strings are extracted, the list obtaining unit 53 determines the content of information list obtaining processing to be executed based on the plurality of character strings, based on the correlation relationship information and the trace corresponding to each of the plurality of character strings, and then executes the list obtaining processing, based on the plurality of character strings.

For example, when the first character string (for example, "X-function") and the second character string (for example, "Y-function") are extracted, the search condition setting unit 55 determines which of AND search and NOT search the first character string is used for as the key word, based on the correlation relationship information (FIG. 9) and the trace (the first trace) that is input by the user when the first character string is extracted. Further, the search condition setting unit 55 determines which of AND search and NOT search the second character string is used for as the key word, based on the correlation relationship information (FIG. 9) and the trace (the second trace) that is input by the user when the second character string is extracted. Then, the list obtaining unit 53 obtains a list of information satisfying the search condition set by the search condition setting unit 55.

(5-2) A second example will be described. For example, the user touches the touch panel with their finger to thereby point out the character string "X-function", and then slides the finger in the upper direction. In the above, when the user does not wish to successively designate another character string, the user slides their finger such that the trace has a longer length than a reference value.

Meanwhile, when the user wishes to successively designate another character string ("Y-function" here), the user slides their finger such that the trace has a length equal to or smaller than the reference value. Thereafter, the user touches the touch panel with their finger to thereby point out the character string "Y-function", and then slides the finger in the lower direction. In the above, when the user wishes to successively designate still another character string, the user slides their finger such that the trace has a length equal to or smaller than the reference value. Meanwhile, when the user does not wish to successively designate still another character string, the user slides their finger such that the trace has a length longer than the reference value. In this case, the character string "X-function" is designated as the key word for AND search, and the character string "Y-function" is designated as the key word for NOT search.

Note that although it is described in the above that the user slides their finger such that the trace has a length longer than the reference value when not wishing to successively designate another character string, alternatively, the user may slide the finger such that the trace has a length equal to or shorter than the reference value when not wishing to successively designate another character string.

Below, operation of the designated position obtaining unit 50, the trace obtaining unit 51, the character string extraction unit 52, and the list obtaining unit 53 when the above described operation is possible will be described.

Initially, the designated position obtaining unit 50 obtains a position (a first position) in the screen designated by the user. Further, the trace obtaining unit 51 obtains a trace (a first trace) input by the user designating the position in the screen and then moving the designated position. Then, the character string extraction unit 52 extracts a character string (a first character string) from the content shown in the screen, based on the position obtained by the designated position obtaining unit 50 (or the trace obtained by the trace obtaining unit 51).

Further, the user terminal 20 determines whether or not the length of the trace obtained by the trace obtaining unit 51 (the first trace) satisfies a predetermined condition. For example, the user terminal 20 determines whether or not the length of the trace obtained by the trace obtaining unit 51 is equal to or smaller than a reference value.

When it is determined that the length of the trace obtained by the trace obtaining unit 51 satisfies the predetermined condition, the user terminal 20 waits until the user newly designates a position in the screen. When the user newly designates a position in the screen, the designated position obtaining unit 50 obtains the newly designated position (a second position). Then, the trace obtaining unit 51 obtains a trace (a second trace) input by the user newly designating the above mentioned position and then moving the newly designated position. Further, the character string extraction unit 52 extracts a character string (a second character string) from the content shown in the screen, based on the position obtained by the designated position obtaining unit 50 (or the trace obtained by the trace obtaining unit 51). Then, the user terminal 20 determines whether or not the length of the trace obtained by the trace obtaining unit 51 (the second trace) satisfies the predetermined condition.

When it is determined that the trace obtained by the trace obtaining unit 51 does not satisfy the predetermined condition (for example, when it is determined that the length of the trace obtained by the trace obtaining unit 51 is not equal to or smaller than the reference value), obtaining by the list obtaining unit 53 is executed. In this case, the list obtaining unit 53 obtains a list of information, based on the character string extracted thus far and the trace obtained thus far. This is similar to that in the first example.

In the above described manner, a user can designate a plurality of character strings and also how to use each of the plurality of character strings in a search condition in the first embodiment.

Note that, similar to the first embodiment, in the second embodiment as well, a user may designate a plurality of character strings as a key item for sorting, and also either the ascending order or the descending order as a sort order with respect to each of the plurality of character strings.

For example, in the product list screen 30 shown in FIG. 2, the "price" may be designated as the first key item, and either the ascending order or the descending order may be designated as a sort order thereof, and the "shop" may be designated as the second key item, and either the ascending order or the descending order may be designated as a sort order thereof.

(6) Further, for example, if the database 12 is accessible from the user terminal 20, the list obtaining unit 53, 53a may directly access the database 12 to obtain a list of information from the database 12. In this case, the "e-commerce server 10" in the functional block diagram shown in FIG. 8 is replaced by the "database 12".

Alternatively, if data necessary to obtain a list of information is stored in the auxiliary storage unit of the user terminal 20, the list obtaining unit 53, 53a may obtain a list of information from the data stored in the auxiliary storage unit of the user terminal 20. In this case, the "e-commerce server 10" in the functional block diagram shown in FIG. 8 is replaced by the "auxiliary storage unit of the user terminal 20".

Figure 17:
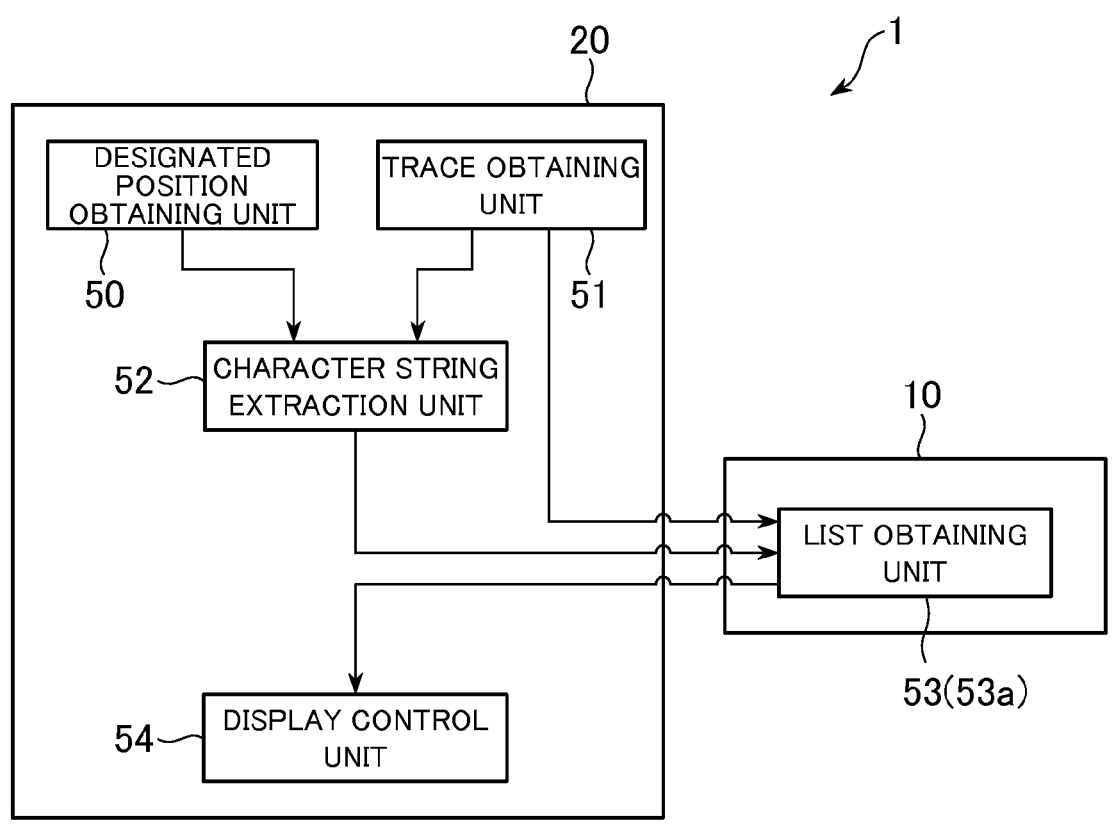
FIG. 17 is a functional block diagram of an e-commerce system according to another embodiment.

(7) Further, for example, the list obtaining unit 53, 53a may be provided at the e-commerce server 10 (the information provision device). That is, the control unit of the e-commerce server 10 may execute processing according to a program to thereby function as the list obtaining units 53, 53a. FIG. 17 is a functional block diagram of the e-commerce system 1 in this case.

In this case, information indicating the character string extracted by the character string extraction unit 52 and information concerning the trace obtained by the trace obtaining unit 51 are sent from the user terminal 20 to the e-commerce server 10. Note here that "information concerning the trace obtained by the trace obtaining unit 51" refers to information indicating the trace itself or information indicating the direction indicated by the trace (or the figure indicated by the trace or the length of the trace).

The list obtaining unit 53, 53a provided at the e-commerce server 10 obtains a list of information, based on the information received from the user terminal 20. That is, the list obtaining unit 53, 53a obtains a list of information, based on the character string extracted by the character string extraction unit 52 and the trace obtained by the trace obtaining unit 51.

When the list obtaining unit 53, 53a is provided at the user terminal 20, the list obtaining unit 53, 53a requests the e-commerce server 10 for a list of information to obtain a list of information from the e-commerce server 10. Meanwhile, when the list obtaining unit 53, 53a is provided at the e-commerce server 10, the list obtaining unit 53, 53a accesses the database 12 to obtain a list of information.

For example, when the list obtaining unit 53 (the search condition setting unit 55) is provided at the e-commerce server 10, the search condition setting unit 55 sets a search condition, based on the character string extracted by the character string extraction unit 52 and the trace obtained by the trace obtaining unit 51. Note that a method for setting a search condition in this case is similar to that in a case in which the list obtaining unit 53 (the search condition setting unit 55) is provided at the user terminal 20. Then, the list obtaining unit 53 obtains a list of information satisfying the search condition from the database 12.

Further, for example, when the list obtaining unit 53a (the sort order setting unit 56) is provided at the e-commerce server 10, the sort order setting unit 56 sets a sort order, based on the character string extracted by the character string extraction unit 52 and the trace obtained by the trace obtaining unit 51. Note that a method for setting a sort order in this case is similar to that in a case in which the list obtaining unit 53a is provided at the user terminal 20. Then, the list obtaining unit 53a obtains, from the database 12, a list of information sorted in the sort order set by the sort order setting unit 56 using an attribute item corresponding to the character string extracted by the character string extraction unit 52 as a key item for sorting.

The list of information obtained by the list obtaining unit 53, 53a is sent from the e-commerce server 10 to the user terminal 20. The display control unit 54 displays the list of information received from the e-commerce server 10 on the display unit.

Figure 18:
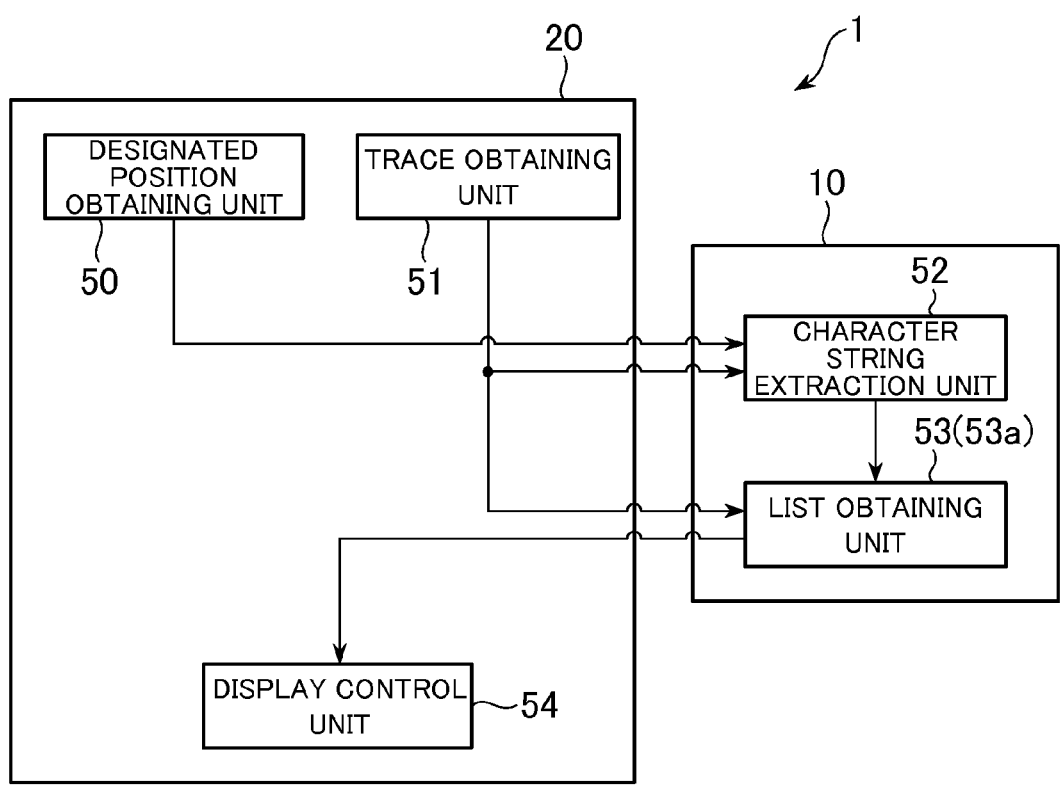
FIG. 18 is a functional block diagram of an e-commerce system according to another embodiment.

(9) Further, for example, the character string extraction unit 52 and the list obtaining unit 53, 53a may be provided at the e-commerce server 10 (an information provision device). That is, the control unit of the e-commerce server 10 may execute processing according to a program, thereby functioning as the character string extraction unit 52 and the list obtaining unit 53, 53a. FIG. 18 is a functional block diagram of the e-commerce system 1 in this case.

In this case, information concerning the designated position obtained by the designate position obtaining unit 50 and information concerning the trace obtained by the trace obtaining unit 51 are sent from the user terminal 20 to the e-commerce server 10. Further, in this case, information concerning the content displayed on the display unit of the user terminal 20 (for example, the content shown in the product list screen 30 or the product screen 40) as well is sent to the e-commerce server 10.

Then, the character string extraction unit 52 provided at the e-commerce server 10 extracts a character string, based on the information received from the user terminal 20. That is, the character string extraction unit 52 extracts a character string from the content, based on the designated position obtained by the designated position obtaining unit 50, the trace obtained by the trace obtaining unit 51, and the content displayed on the display unit of the user terminal 20.

The list obtaining unit 53, 53a obtains a list of information, based on the character string extracted by the character string extraction unit 52 and the trace obtained by the trace obtaining unit 51. An operation of the list obtaining unit 53, 53a is similar to that of the list obtaining unit 53, 53a in FIG. 17, and thus not described here.

(10) Further, for example, in the product list screen 30 and the product screen 40, a character string which can be designated by a user may be specified in advance. For example, a character string that is appropriate to be designated as a key word may be specified in advance. Then, only when a specified character string is pointed out by a user, the character string extraction unit 52 may extract the character string.

Note that, in this case, a character string which can be designated by the user may be shown enclosed by a predetermined tug in the product list page data and the product page data. Alternatively, a list of character strings which can be designated by the user may be embedded in the product list page data and the product page data.

Further, in this case, a character string which can be designated by the user may be shown in a distinguished manner from that which cannot be designated by the user in the product list screen 30 and the product screen 40.

(11) Further, for example, a pointing device for use by a user to designate a position in a screen is not limited to a touch panel. For example, in a case as well in which a user uses a mouse or a stick to designate a position in a screen, the present invention is applicable. That is, in a case in which a cursor that moves in accordance with an operation of a mouse or a stick is shown in a screen and the position of the cursor is obtained as a position designated by a user when the user presses a predetermined button, the present invention is applicable.

(12) Note that in the e-commerce system 1, not only a product, such as television or the like, but also data such as, for example, electronic book data, music data, video data, or the like, may be sold as a product. Further, in the e-commerce system 1, not only e-commerce between a shop and a consumer but also one between consumers may be conducted.

Further, in the e-commerce system 1, a service may be provided by a service provider. In this case as well, application of the present invention makes it possible for a user to conduct service search and to set a sort order for a service list with a single simple operation.

Further, the present invention can be applied to a system other than an e-commerce system. That is, an information provision system according to an embodiment of the present invention can be implemented in a system other than an e-commerce system.

The invention claimed is:

1. An information provision system for providing a user with a list of information, the information provision system comprising a user terminal and a server, the information provision system comprising:
 a unit, implemented at least one microprocessor of the user terminal, that displays a screen showing content on a display;
 a designated position obtaining unit, implemented by the at least one microprocessor of the user terminal, that obtains a position in the screen designated by the user;
 a trace obtaining unit, implemented by the at least one microprocessor of the user terminal or at least one microprocessor of the server, that obtains a trace input by the user when the user designates a position in the screen and then moves the designated position to thereby input a trace;
 a character string extraction unit, implemented by the at least one microprocessor of the user terminal or the at least one microprocessor of the server, that extracts a character string pointed out by the user from among a plurality of character strings included in content shown in the screen, based on the position obtained by the designated position obtaining unit or the trace obtained by the trace obtaining unit;
 a list obtaining unit, implemented by the at least one microprocessor of the user terminal or the at least one microprocessor of the server, that obtains a list of information, based on the character string extracted by the character string extraction unit and the trace obtained by the trace obtaining unit; and
 a list screen display control unit, implemented by the least one microprocessor of the user terminal, that displays on the display a list screen showing the list of information obtained by the list obtaining unit,
 wherein the list obtaining unit comprises a search condition setting unit that sets a search condition using the character string, and obtains a list of information satisfying the search condition, and the search condition setting unit determines a manner of using the character string in a search condition based on the trace and correlation relationship information, and sets a search condition using the character string in the determined manner of use, the correlation relationship information being information concerning a correlation relationship between the trace and the manner of using the character string in the search condition, the manner of using the character string in the search condition being set to a manner correlated to the trace.

2. The information provision system according to claim 1, wherein the correlation relationship information is defined such that a search condition for obtaining a list of information relevant to the character string extracted by the character string extraction unit is set in the case where the trace obtained by the trace obtaining unit belongs to a first type, and a search condition for obtaining a list of information not relevant to the character string extracted by the character string extraction unit is set in the case where the trace obtained by the trace obtaining unit belongs to a second type, and the search condition setting unit sets either the search condition for obtaining the list of information relevant to the character string extracted by the character string extraction unit or the search condition for obtaining the list of information not relevant to the character string extracted by the character string extraction unit, based on the trace obtained by the trace obtaining unit.

3. The information provision system according to claim 1, wherein the character string extracted by the character string extraction unit indicates an attribute value relevant to an attribute of the information, the correlation relationship information is defined such that a search condition for obtaining a list of information having an attribute value equal to or larger than an attribute value indicated by the character string extracted by the character string extraction unit or an attribute value larger than the attribute value indicated by the character string extracted by the character string extraction unit is set in the case where the trace obtained by the trace obtaining unit belongs to a first type, and a search condition for obtaining a list of information having an attribute value equal to or smaller than the attribute value indicated by the character string extracted by the character string extraction unit or an attribute value smaller than the attribute value indicated by the character string extracted by the character string extraction unit is set in the case where the trace obtained by the trace obtaining unit belongs to a second type, and the search condition setting unit sets either the search condition for obtaining the list of information having the attribute value equal to or larger than the attribute value indicated by the character string extracted by the character string extraction unit or the attribute value larger than the attribute value indicated by the character string extracted by the character string extraction unit, or the search condition for obtaining the list of information having the attribute value equal to or smaller than the attribute value indicated by the character string extracted by the character string extraction unit or the attribute value smaller than the attribute value indicated by the character string extracted by the character string extraction unit, based on the trace obtained by the trace obtaining unit.

4. The information provision system according to claim 1, wherein a sentence relevant to the information and at least one of a plurality of kinds of categories are correlated to the information, the correlation relationship information is defined such that a search condition for obtaining a list of information relevant to the character string extracted by the character string extraction unit is set in the case where the trace obtained by the trace obtaining unit belongs to a predetermined type, and the search condition setting unit comprises:

a unit that determines whether or not the character string extracted by the character string extraction unit indicates any of the plurality of kinds of categories, in the case where the search condition for obtaining the list of information relevant to the character string extracted by the character string extraction unit is set, a unit that sets, in the case where it is determined that the character string extracted by the character string extraction unit indicates any of the plurality of kinds of categories, a search condition for searching for a list of information correlated to the category indicated by the character string extracted by the character string extraction unit, and a unit that sets, in the case where it is not determined that the character string extracted by the character string extraction unit indicates any of the plurality of kinds of categories, a search condition for searching for a list of information such that the sentence includes the character string extracted by the character string extraction unit.

5. An information provision system for providing a user with a list of information, the information provision system comprising a user terminal and a server, the information provision system comprising:

a unit, implemented by at least one microprocessor of the user terminal, that displays a screen showing content on a display;

a designated position obtaining unit, implemented by the at least one microprocessor of the user terminal, that obtains a position in the screen designated y the user;

a trace obtaining unit, implemented by the at least one microprocessor of the user terminal or at least one microprocessor of the server, that obtains a trace input by the user when the user designates a position in the screen and then moves the designated position to thereby input a trace;

a character string extraction unit, implemented by the at least one microprocessor of the user terminal or the at least one microprocessor of the server, that extracts a character string pointed out by the user from among a plurality of character strings included in content shown in the screen, based on the position obtained by the designated position obtaining unit or the trace obtained by the trace obtaining unit;

a list obtaining unit, implemented by the at least one microprocessor of the user terminal or the at least one microprocessor of the server, that obtains a list of information, based on the character string extracted by the character string extraction unit and the trace obtained by the trace obtaining unit; and a list screen display control unit, implemented by the at least one microprocessor of the user terminal, that displays on the display a list screen showing the list of information obtained by the list obtaining unit, wherein the list obtaining unit comprises a sort order setting unit that sets a sort order for a list of information based on the trace and correlation relationship information, and obtains a list of information sorted in the sort order using as a key item an item corresponding to the character string pointed out by the user, the correlation relationship information being information concerning a correlation relationship between the trace and the sort order, the sort order for the list of information being set to a sort order correlated to the trace.

6. The information provision system according to claim 5, wherein the correlation relationship information is defined such that the sort order for the list of information is set to an ascending order in the case where the trace obtained by the trace obtaining unit is a first type, and the sort order for the list of information is set to a descending order in the case where the trace obtained by the trace obtaining unit is a second type, and the sort order setting unit sets either the ascending order or the descending order as the sort order for the list of information, based on the trace obtained by the trace obtaining unit.

7. An information provision system for providing a user with a list of information, the information provision system comprising a user terminal and a server, the information provision system comprising:

a unit, implemented by at least one microprocessor of the user terminal, that displays a screen showing content on a display;

a designated position obtaining unit, implemented by the at least one microprocessor of the user terminal, that obtains a position in the screen designated the user;

a trace obtaining unit, implemented by the at least one microprocessor of the user terminal or at least one microprocessor of the server, that obtains a trace input by the user when the user designates a position in the screen and then moves the designated position to thereby input a trace;

a character string extraction unit, implemented by the at least one microprocessor of the user terminal or the at least one microprocessor of the server, that extracts a character string pointed out by the user from among a plurality of character strings included in content shown in the screen, based on the position obtained by the designated position obtaining unit or the trace obtained by the trace obtaining unit;

a list obtaining unit, implemented by the at least one microprocessor of the user terminal or the at least one microprocessor of the server, that obtains a list of information, based on the character string extracted by the character string extraction unit and the trace obtained by the trace obtaining unit; and a list screen display control unit, implemented by the at least one microprocessor of the user terminal, that displays on the display a list screen showing the list of information obtained by the list obtaining unit, wherein the list obtaining unit comprises:

a unit that determines, based on the trace and correlation relationship information, content of processing for obtaining a list of information, the correlation relationship information being information concerning a correlation relationship between the trace and the content of the processing; and a unit that executes the determined processing based on the character string, the information provision system further comprises a unit, implemented by the at least one microprocessor of the user terminal or the at least one microprocessor of the server, that determines whether or not a position in the screen is newly designated by the user within a reference period of time after completion of input of the trace by the user, in the case where it is determined that a position in the screen is newly designated by the user during the period, the designated position obtaining unit obtains the newly designated position, in the case where the user newly designates a position in the screen and thereafter changes the newly designated position to thereby newly input a trace, the trace obtaining unit obtains the trace newly input by the user, the character string extraction unit newly extracts a character string from content shown in the screen, based on the position newly designated by the user or the trace newly input by the user, and in the case where it is determined that no position in the screen is newly designated by the user during the period, the list obtaining unit obtains the list of information, based on a character string extracted thus far and a trace input thus far.

8. The information provision system according to claim 5, further comprising:

a unit, implemented by the at least one microprocessor of the user terminal or the at least one microprocessor of the server, that determines whether or not a position in the screen is newly designated by the user within a reference period of time after completion of input of the trace by the user, wherein in the case where it is determined that a position in the screen is newly designated by the user during the period, the designated position obtaining unit obtains the newly designated position, in the case where the user newly designates a position in the screen and thereafter changes the newly designated position to thereby newly input a trace, the trace obtaining unit obtains the trace newly input by the user, the character string extraction unit newly extracts a character string from content shown in the screen, based on the position newly designated by the user or the trace newly input by the user, and in the case where it is determined that no position in the screen is newly designated by the user during the period, the list obtaining unit obtains the list of information, based on a character string extracted thus far and a trace input thus far.

9. The information provision system according to claim 1, further comprising:

a unit, implemented by the at least one microprocessor of the user terminal or the at least one microprocessor of the server, that determines whether or not a length of the trace obtained by the trace obtaining unit satisfies a predetermined condition, wherein in the case where it is determined that the length of the trace obtained by the trace obtaining unit satisfies the predetermined condition and a position in the screen is newly designated by the user, the designated position obtaining unit obtains the newly designated position, in the case where the user newly designates a position in the screen and thereafter changes the newly designated position to thereby newly input a trace, the trace obtaining unit obtains the trace newly input by the user, the character string extraction unit newly extracts a character string from content shown in the screen, based on the position newly designated by the user or the trace newly input by the user, and in the case where it is determined that the length of the trace obtained by the trace obtaining unit does not satisfy the predetermined condition, the list obtaining unit obtains the list of information, based on a character string extracted thus far and a trace obtained thus far.

10. The information provision system according to claim 5, further comprising:

a unit, implemented by the at least one microprocessor of the user terminal or the at least one microprocessor of the server, that determines whether or not a length of the trace obtained by the trace obtaining unit satisfies a predetermined condition, wherein in the case where it is determined that the length of the trace obtained by the trace obtaining unit satisfies the predetermined condition and a position in the screen is newly designated by the user, the designated position obtaining unit obtains the newly designated position, in the case where the user newly designates a position in the screen and thereafter changes the newly designated position to thereby newly input a trace, the trace obtaining unit obtains the trace newly input by the user, the character string extraction unit newly extracts a character string from content shown in the screen, based on the position newly designated by the user or the trace newly input by the user, and in the case where it is determined that the length of the trace obtained by the trace obtaining unit does not satisfy the predetermined condition, the list obtaining unit obtains the list of information, based on a character string extracted thus far and a trace obtained thus far.

11. The information provision system according to claim 1, further comprising:

a presentation image display control unit, implemented by the at least one microprocessor of the user terminal, that shows in the screen, a presentation image for presenting to the user the correlation relationship indicated by the correlation relationship information, in the case where the position in the screen designated by the user is obtained by the designated position obtaining unit.

12. The information provision system according to claim 5, further comprising:

a presentation image display control unit, implemented by the at least one microprocessor of the user terminal, that shows in the screen, a presentation image for presenting to the user the correlation relationship indicated by the correlation relationship information, in the case where the position in the screen designated by the user is obtained by the designated position obtaining unit.

13. The information provision system according to claim 1, wherein the correlation relationship information storage unit stores the correlation relationship information so as to be correlated to a character string, and the list obtaining unit determines the information list obtaining processing correlated to the trace that is input by the user after the character string is pointed out by the user, based on correlation relationship information correlated to the character string pointed out by the user, and executes the information list obtaining processing, based on the character string pointed out by the user.

14. The information provision system according to claim 5, wherein the correlation relationship information storage unit stores the correlation relationship information so as to be correlated to a character string, and the list obtaining unit determines the information list obtaining processing correlated to the trace that is input by the user after the character string is pointed out by the user, based on correlation relationship information correlated to the character string pointed out by the user, and executes the information list obtaining processing, based on the character string pointed out by the user.

15. The information provision system according to claim 13, further comprising:

a presentation image display control unit, implemented by the at least one microprocessor of the user terminal, that shows in the screen, a presentation image for presenting to the user the correlation relationship indicated by the correlation relationship information correlated to the character string pointed out by the user, in the case where the position in the screen designated by the user is obtained by the designated position obtaining unit.

16. The information provision system according to claim 14, further comprising:

a presentation image display control unit, implemented by the at least one microprocessor of the user terminal, that shows in the screen, a presentation image for presenting to the user the correlation relationship indicated by the correlation relationship information correlated to the character string pointed out by the user, in the case where the position in the screen designated by the user is obtained by the designated position obtaining unit.

17. A computer implemented method for controlling an information provision system for providing a user with a list of information, the information provision system comprising a user terminal and a server, the method comprising:

displaying, by at least one microprocessor of the user terminal, a screen showing content on a display;

obtaining, by the at least one microprocessor of the user terminal, a position in the screen designated by the user;

obtaining, by the at least one microprocessor of the user terminal or at least one microprocessor of the server, a trace input by the user when the user designates a position in the screen and then moves the designated position to thereby input a trace;

extracting, by the at least one microprocessor of the user terminal or the at least one microprocessor of the server, a character string pointed out by the user from among a plurality of character strings included in content shown in the screen, based on the obtained position or the obtained trace;

obtaining, by the at least one microprocessor of the user terminal or the at least one microprocessor of the server, a list of information, based on the extracted character string and the obtained trace; and displaying, by the at least one microprocessor of the user terminal, on the display a list screen showing the list of information obtained, wherein the obtaining the list of information comprises setting a search condition using the extracted character string, and obtaining a list of information satisfying the search condition, and the setting the search condition comprises determining a manner of using the extracted character string in a search condition based on the obtained trace and correlation relationship information, and setting a search condition using the extracted character string in the determined manner of use, the correlation relationship information being information concerning a correlation relationship between the trace and the manner of using the character string in the search condition, the manner of using of the character string in the search condition being set to a manner correlated to the trace.

18. A computer implemented method for controlling an information provision system for providing a user with a list of information, the information provision system comprising a user terminal and a server, the method comprising:

displaying, by at least one microprocessor of the user terminal, a screen showing content on a display;

obtaining, by the at least one microprocessor of the user terminal, a position in the screen designated by the user;

obtaining, by the at least one microprocessor of the user terminal or at least one microprocessor of the server, a trace input by the user when the user designates a position in the screen and then moves the designated position to thereby input a trace;

extracting, by the at least one microprocessor of the user terminal or the at least one microprocessor of the server, a character string pointed out by the user from among a plurality of character strings included in content shown in the screen, based on the obtained position or the obtained trace;

obtaining, by the at least one microprocessor of the user terminal or the at least one microprocessor of the server, a list of information, based on the extracted character string and the obtained trace; and displaying, by the at least one microprocessor of the user terminal, on the display a list screen showing the list of information obtained, wherein the obtaining the list of information comprises setting a sort order for a list of information based on the trace and correlation relationship information, and obtaining a list of information sorted in the sort order using as a key item an item corresponding to the character string pointed out by the user, the correlation relationship information being information concerning a correlation relationship between the trace and the sort order, the sort order for the list of information being set to a sort order correlated to the trace.

19. A computer implemented method for controlling an information provision system for providing a user with a list of information, the information provision system comprising a user terminal and a server, the method comprising:

displaying, by at least one microprocessor of the user terminal, a screen showing content on a display;

obtaining, by the at least one microprocessor of the user terminal, a position in the screen designated by the user;

obtaining, by the at least one microprocessor of the user terminal or at least one microprocessor of the server, a trace input by the user when the user designates a position in the screen and then moves the designated position to thereby input a trace;

extracting, by the at least one microprocessor of the user terminal or the at least one microprocessor of the server, a character string pointed out by the user from among a plurality of character strings included in content shown in the screen, based on the obtained position or the obtained trace;

obtaining, by the at least one microprocessor of the user terminal or the at least one microprocessor of the server, a list of information, based on the extracted character string and the obtained trace; and displaying, by the at least one microprocessor of the user terminal, on the display a list screen showing the list of information obtained, wherein the obtaining the list of information comprises:

determining, based on the trace and correlation relationship information, content of processing for obtaining a list of information, the correlation relationship information being information concerning a correlation relationship between the trace and the content of the processing; and executing the determined processing based on the character string, the method further comprises determining, by the at least one microprocessor of the user terminal or the at least one microprocessor of the server, whether or not a position in the screen is newly designated by the user within a reference period of time after completion of input of the trace by the user, in the case where it is determined that a position in the screen is newly designated by the user during the period, the newly designated position is obtained, in the case where the user newly designates a position in the screen and thereafter changes the newly designated position to thereby newly input a trace, the trace newly input by the user is obtained, a character string is newly extracted from content shown in the screen, based on the position newly designated by the user or the trace newly input by the user, and in the case where it is determined that no position in the screen is newly designated by the user during the period, the list of information is obtained based on a character string extracted thus far and a trace input thus far.

* * * * *